(12) United States Patent
Black

(10) Patent No.: US 12,000,437 B1
(45) Date of Patent: Jun. 4, 2024

(54) CONE CLUTCH SYSTEM INCLUDING INDEPENDENT FRICTION MEMBER

(71) Applicant: Rolls-Royce Corporation, Indianapolis, IN (US)

(72) Inventor: Joseph D. Black, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/342,498

(22) Filed: Jun. 27, 2023

(51) Int. Cl.
*F16D 13/66* (2006.01)
*F16D 13/26* (2006.01)

(52) U.S. Cl.
CPC .............. *F16D 13/66* (2013.01); *F16D 13/26* (2013.01)

(58) Field of Classification Search
CPC .......... F16D 13/66; F16D 13/24; F16D 13/26; F16D 27/11; F16D 25/0632
See application file for complete search history.

(56) References Cited

U.S. PATENT DOCUMENTS

| | | |
|---|---|---|
| 2,865,481 A | 12/1958 | Giri De Termala |
| 3,300,004 A | 1/1967 | Peterson |
| 3,823,802 A | 7/1974 | Winzeller et al. |
| 4,030,583 A | 6/1977 | Miller |
| 4,262,789 A | 4/1981 | Collins |
| 4,593,801 A | 6/1986 | Tekeuchi et al. |
| 6,834,751 B1 | 12/2004 | Magee |
| 7,308,977 B2 | 12/2007 | Maguire et al. |
| 7,799,250 B2 | 9/2010 | Huener et al. |
| 8,051,968 B2 | 11/2011 | Arnold et al. |
| 8,100,239 B2 | 1/2012 | Swanson et al. |
| 8,893,868 B2 | 11/2014 | Kennedy |
| 9,921,037 B2 | 3/2018 | Wadley et al. |
| 10,830,286 B2 | 11/2020 | Zhang et al. |
| 2004/0159524 A1 | 8/2004 | Carpenter et al. |
| 2006/0049017 A1 | 3/2006 | Furuichi |
| 2006/0180423 A1 | 8/2006 | Kos et al. |

(Continued)

FOREIGN PATENT DOCUMENTS

| | | |
|---|---|---|
| EP | 1342932 B1 | 4/2008 |
| EP | 3273085 A1 | 1/2018 |

OTHER PUBLICATIONS

Lighter Rotors More Muscle, retrieved from https://www.ceramicdisctech.com on Jul. 21, 2021, 2 pp.

(Continued)

*Primary Examiner* — Timothy Hannon
(74) *Attorney, Agent, or Firm* — Shumaker & Sieffert, P.A.

(57) ABSTRACT

In one example, a cone clutch assembly including an inner cone member rotationally coupled to a first shaft, the inner cone member defining a first friction surface; an outer cone member rotationally coupled to a second shaft, the outer cone member defining a second friction surface opposing the first friction surface; and an independent friction member positioned between the inner and the outer cone member. The inner cone member and outer cone member are configured to be selectively engaged and disengaged from each other. When the inner cone member is engaged with the outer cone member, the first friction surface of the inner cone member frictionally engages one surface of the friction member, and the second friction surface of the outer cone member engages another surface of the friction member such that rotational motion is transferred between the inner and outer cone member via the friction member.

20 Claims, 14 Drawing Sheets

(56) References Cited

U.S. PATENT DOCUMENTS

| | | |
|---|---|---|
| 2007/0023253 A1 | 2/2007 | Wayman |
| 2009/0114498 A1 | 5/2009 | Arnold et al. |
| 2011/0259699 A1 | 10/2011 | Swanson |
| 2015/0211586 A1 | 7/2015 | Hutchinson |
| 2015/0267765 A1 | 9/2015 | Kim et al. |
| 2016/0084321 A1 | 3/2016 | Mihajlovic et al. |
| 2016/0178016 A1 | 6/2016 | Swift et al. |
| 2018/0112720 A1 | 4/2018 | Choi et al. |
| 2018/0266493 A1 | 9/2018 | Dempfle et al. |
| 2019/0120309 A1 | 4/2019 | Sung et al. |
| 2021/0054883 A1 | 2/2021 | Grethel et al. |
| 2021/0207671 A1 | 7/2021 | Siegel et al. |

OTHER PUBLICATIONS

Prosecution History from U.S. Appl. No. 17/564,288, dated Mar. 31, 2023 through Dec. 13, 2022, 36 pp.

U.S. Appl. No. 17/564,288, filed Dec. 29, 2021, naming inventor Joseph D. Black.

Zelinski, "Lighter, Better-Performing Brake Rotor From 3D Printing: The Cool Parts Show #27," Additive Manufacturing, Mar. 31, 2021, 6 pp.

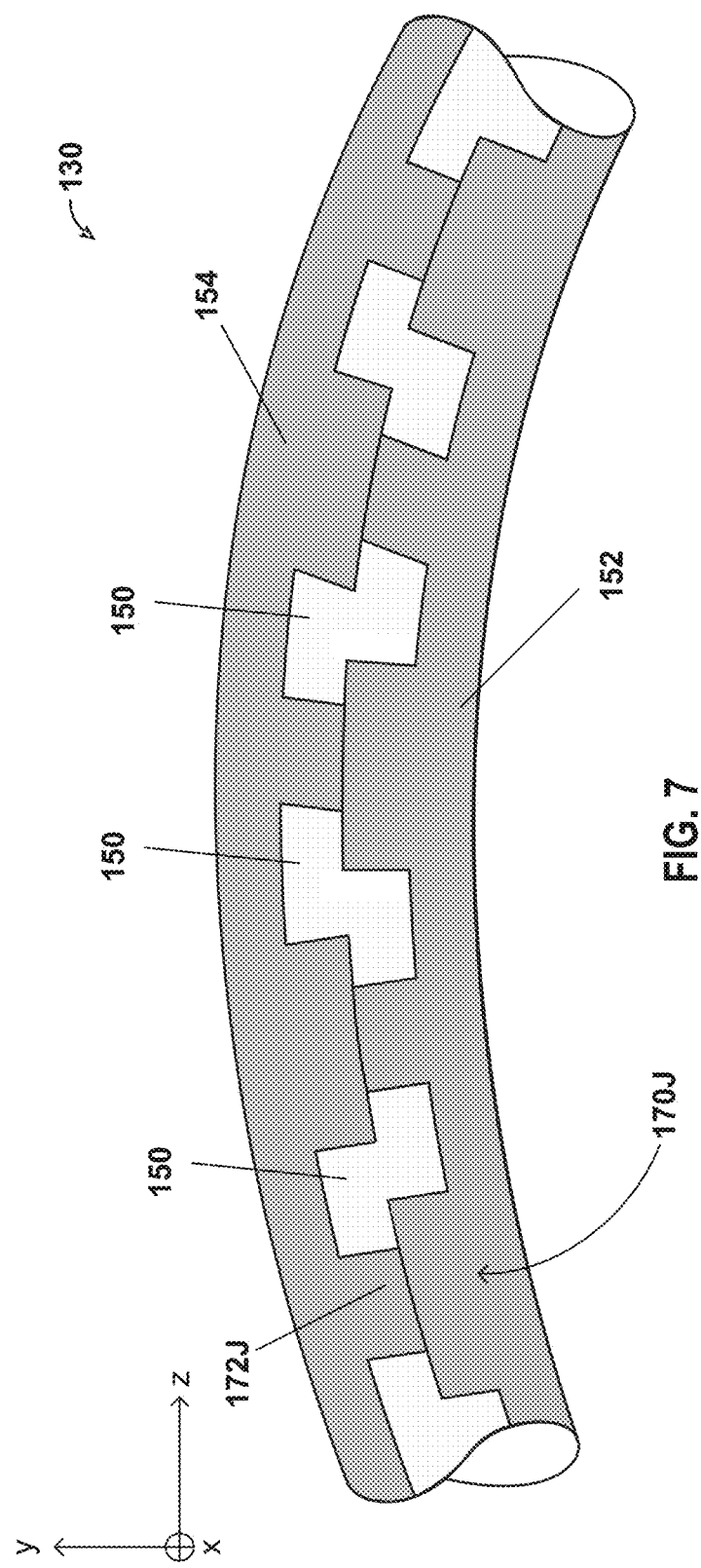

CONE CLUTCH SYSTEM INCLUDING INDEPENDENT FRICTION MEMBER

This invention was made with government support under contract W911W6-19-9-0005 awarded by the Department of the Army. The government has certain rights in the invention.

TECHNICAL FIELD

The disclosure relates to cone clutch assemblies and systems that include the same.

BACKGROUND

Gas turbine engines include various accessory components to enable the engine to operate, such as, for example, fuel pumps, oil pumps, electric generators and/or motors. Often, accessory components are driven by a turbine through an accessory gearbox. In some implementations, accessory components are rotationally coupled to the accessory gearbox using a mechanical clutch, which allows selective disconnection of the accessory components from the gearbox and turbine when the accessory components are not needed.

SUMMARY

The disclosure describes cone clutch assemblies, systems including such assemblies, and techniques for making and using the same. An example cone clutch assembly may include an inner cone member (or "male cone") that is configured to selectively engage an outer cone member (or "female cone") with an independent friction member positioned between the opposing surfaces of the outer and inner cone members. For example, the independent friction member may not be mechanically attached to either the inner cone member or the outer cone member, e.g., allowing the friction member to rotate freely from the inner and outer cone member when the cone members are not engaged with each other via the friction member. In this manner, the differential speed between the outer cone member and inner cone member when transitioning to an engaged configuration may be less than if the inner cone member and outer cone member contacted each other directly when engaged.

In some examples, the disclosure describes a cone clutch assembly comprising an inner cone member configured to be rotationally coupled to a first shaft, the inner cone member defining a first friction surface; an outer cone member configured to be rotationally coupled to a second shaft, the outer cone member defining a second friction surface opposing the first friction surface; and an independent friction member positioned between the first friction surface of the inner cone member and the second friction surface of the outer cone member, wherein the inner cone member and outer cone member are configured to be selectively engaged and disengaged from each other, wherein, when the inner cone member is engaged with the outer cone member, the first friction surface of the inner cone member frictionally engages a third friction surface of the friction member, and the second friction surface of the outer cone member engages a fourth friction surface of the friction member such that rotational motion is transferred between the inner cone member and the outer cone member via the friction member.

In some examples, the disclosure describes a method of operating a cone clutch assembly, the method comprising engaging an inner cone member with the outer cone member with an independent friction member positioned between the first friction surface of the inner cone member and the second friction surface of the outer cone member, wherein the inner cone member is rotationally coupled to a first shaft and defines a first friction surface, wherein the outer cone member is rotationally coupled to a second shaft and defines a second friction surface, wherein, when the inner cone member is engaged with the outer cone member, the first friction surface of the inner cone member frictionally engages a third friction surface of the friction member, and the second friction surface of the outer cone member engages a fourth friction surface of the friction member such that rotational motion is transferred between the inner cone member and the outer cone member via the friction member.

The details of one or more examples are set forth in the accompanying drawings and the description below. Other features, objects, and advantages will be apparent from the description and drawings, and from the claims.

BRIEF DESCRIPTION OF DRAWINGS

FIG. 7 is a conceptual diagram illustrating a partial view of a portion of another example independent friction member.

DETAILED DESCRIPTION

Figure 1:
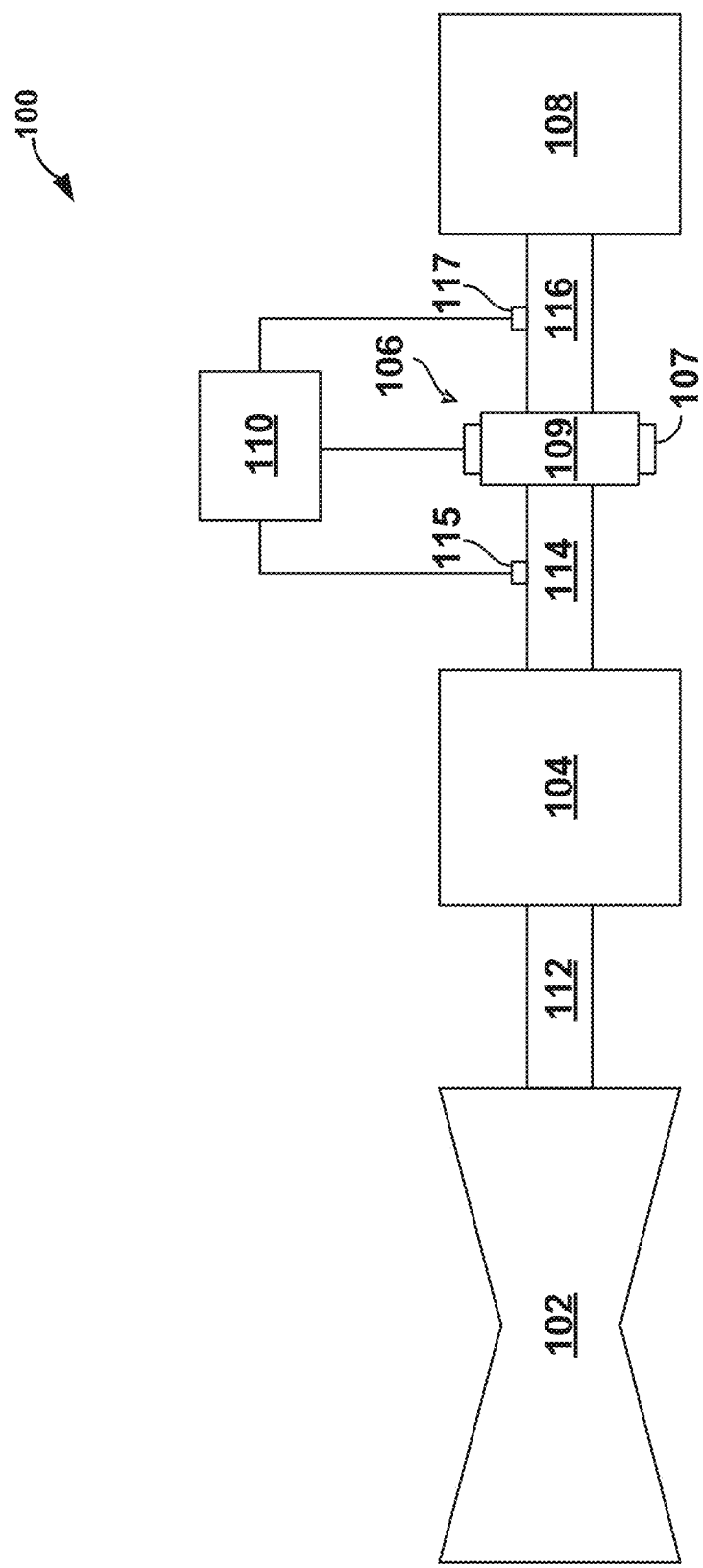
FIG. 1 is a conceptual diagram illustrating an example system including an example cone clutch assembly.

The disclosure generally describes systems including a cone clutch assembly, and techniques for using the same. The cone clutch assembly may include an inner cone member (or "male cone") that is configured to selectively engage an outer cone member (or "female cone") with an independent friction member positioned between the opposing surfaces of the outer and inner cone members. For example, the independent friction member may not be mechanically attached to either the inner cone member or the outer cone member, e.g., allowing the friction member to rotate freely from the inner and outer cone member when the cone members are not engaged with each other via the friction member. In this manner, the differential speed between the outer cone member and inner cone member when transitioning to an engaged configuration may be less than if the inner cone member and outer cone member contacted each other directly when engaged.

In some examples, cone clutch assemblies may be used to control engagement of system accessories, such as aircraft accessories of gas turbine engine systems. In some examples, the clutch assembly may engage or disengage a reduction gearbox which drives a propeller for forward thrust of the aircraft, such as a helicopter. The cultch assembly may be driven by an engine via the helicopter reduction gearbox. Other uses of such as clutch assembly are contemplated.

A cone clutch assembly may have an input and an output shaft selectively coupled or decoupled (also referred to as engaged and disengaged) by two mating cone members, e.g., to selectively connect and disconnect, respectively, power/motion in a driveline. The input shaft may be continually driven by prime mover such as an engine or motor. The output shaft of the clutch can be engaged or disengaged from the prime mover allowing it to drive or disconnect driven assemblies such as gearboxes, fans, generators, etc. The cone members may be selectively engaged or coupled together by application of an axial force to clamp the inner (male) and outer (female) cone members together via friction. Typically, one cone member may be constructed from steel and the other member incorporates a friction liner to uniformly control friction and provide wear resistance. The liner may be used to control friction and improve wear resistance, and may be fabricated from materials such as bronze, carbon/carbon, Kevlar fiber encapsulated by a binder material or other friction tolerant materials to provide the clutch function. The steel cone member may be case or core hardened for durability.

Cone clutches may offer a number of significant advantages over other styles of clutches in terms of compact packaging and low weight. Power density and circumferential velocities at the friction (rubbing) surfaces may control the package size of the arrangement. These limitations are driven by wear and/or temperatures at the friction (rubbing) surfaces of the clutch. The temperatures are typically controlled by some type of cooling media, such as oil, which is directed into the friction surfaces. The friction liner may be selected to optimize or otherwise provide desirable performance in terms of wear rate and friction characteristics, and the like.

In some examples, a cone clutch may be designed such that only one of the cone clutch members includes a friction liner that is bonded to the inner or outer cone member by a high temperature adhesive and/or mechanical means such as fasteners. The friction surfaces between the two mating cone members can be difficult to cool and lubricate for high speed/high friction surface velocity applications. Oil supply to the liner interfaces may provide a cooling and lubrication medium for the cone members. However, the interface can be very difficult to oil cool due to the high energy levels and high differential speeds between the cone members for compact designs. This energy should be dissipated in a relatively short time interval required to engage the clutch. The high differential speeds between the cone members can create high temperatures which are difficult to control in such very compact designs. These high temperatures may cause premature wear and/or melting of the liner material and/or liner bonding materials, leading to low clutch life. In high-speed applications, the differential surface velocities may be particularly key to providing a high life compact design. Increasing differential speed at the friction surface when the cone members are engaged may increase the amount of energy (e.g., in BTUs) generated at the liner interface which increases temperature and wear rate.

Additionally, the liner materials often must be bonded to the inner or outer cone member. These bonding approaches often end up being a point of possible failure in the arrangement due to temperature limitations of the bonding material. Many liner materials such as carbon-carbon liners have high temperature capability. However, the liner bond joint becomes a possible point of failure and may debond from the inner or outer member steel interfaces due to the temperature limitations.

In accordance with examples of the disclosure, a cone clutch assembly may include a intermediately positioned friction member between the inner and outer cone members that may be independent from the respective cone members. For example, the friction member may be independent from the respective cone members in that the friction member may not be mechanically attached to a surface of either of the respective cone member. In some examples, the friction member may be independent from the respective cone members in that the friction member may be rotated freely between the respective cone members, e.g., when one or both of the inner and outer cone members are not rotating. For example, the intermediately positioned friction member may include a radial arm portion that extends from the frictional surface to a central shaft (e.g., the input shaft) of the clutch assembly and that is supported by a bearing (e.g., a duplex bearing). The radial arm and bearing support may keep the friction member centered or otherwise positioned between the inner and outer cone members when the clutch assembly is in a disengaged configuration. When the cone members are in an engaged configuration, the independent friction member may rotate at speed that is substantially the same as the inner and outer cone members, e.g., due to the friction engagement between the cone members via the friction member.

In some examples, employing an independent friction member may allow for one or more design features. In some examples, both the inner and outer cone members can be constructed of hardened steel surfaces at the friction/rub interface or other materials with good wear properties. In accordance with some examples of the disclosure, the friction member becomes a separate independent member from the inner and outer cone members. Portions of friction member can be constructed in part from a material with high temperature and high strength capabilities that acts as a backing layer to support one or more layers of friction material. This backing layer (also referred to herein as a backing support layer or support layer) can be constructed from any higher strength material such as steel. The friction material can be applied to both the outer diameter (OD) of the backing layer opposing the inner cone member and the inner diameter (ID) of the backing layer opposing the outer cone member to form two separate rub (friction) surfaces. The friction material may be mechanically joined to the liner backing layer. The friction material may not have a lot of strength and the backing layer may help to carry any engagement and/or centrifugal loads subjected to the layer of friction material.

Figure 5:
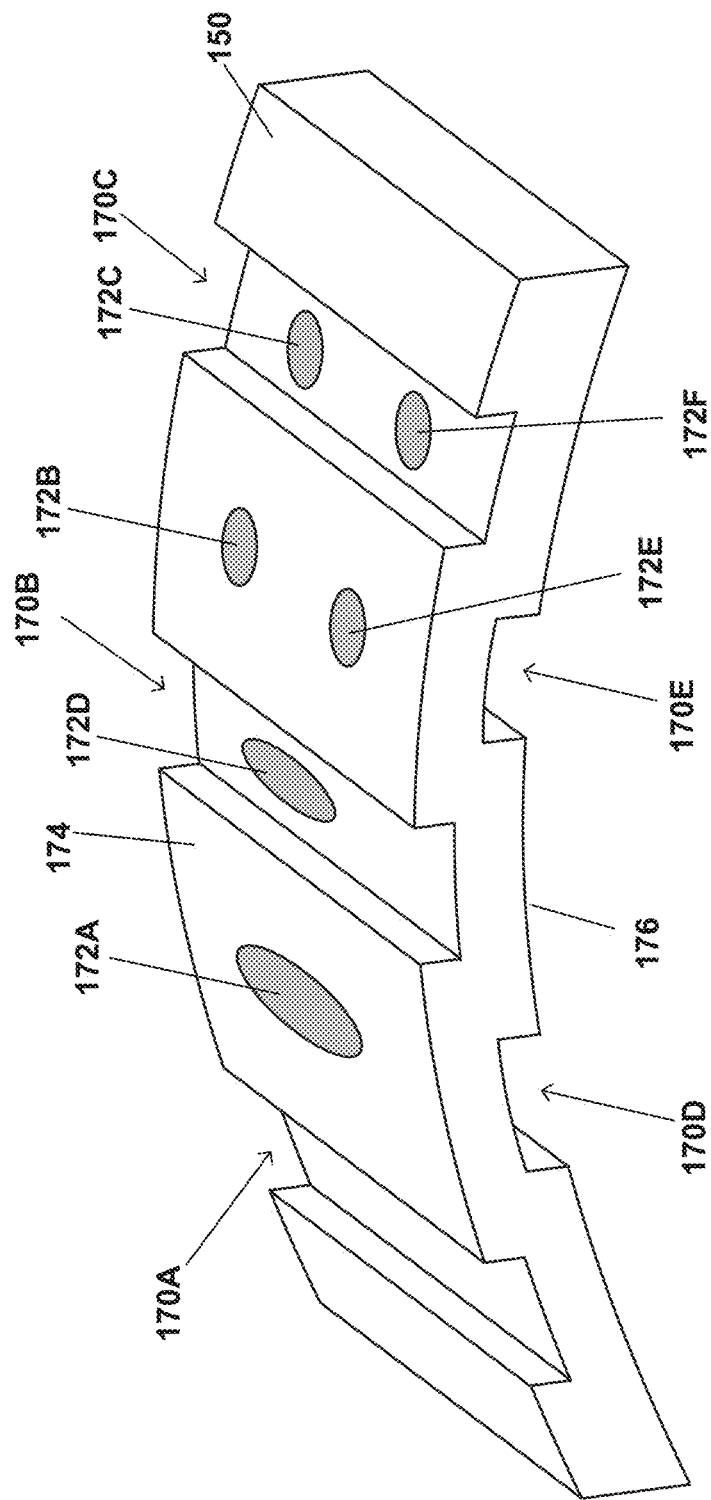
FIG. 5 is a conceptual diagram illustrating a partial view of a backing support layer of an example independent friction member.
Figure 6:
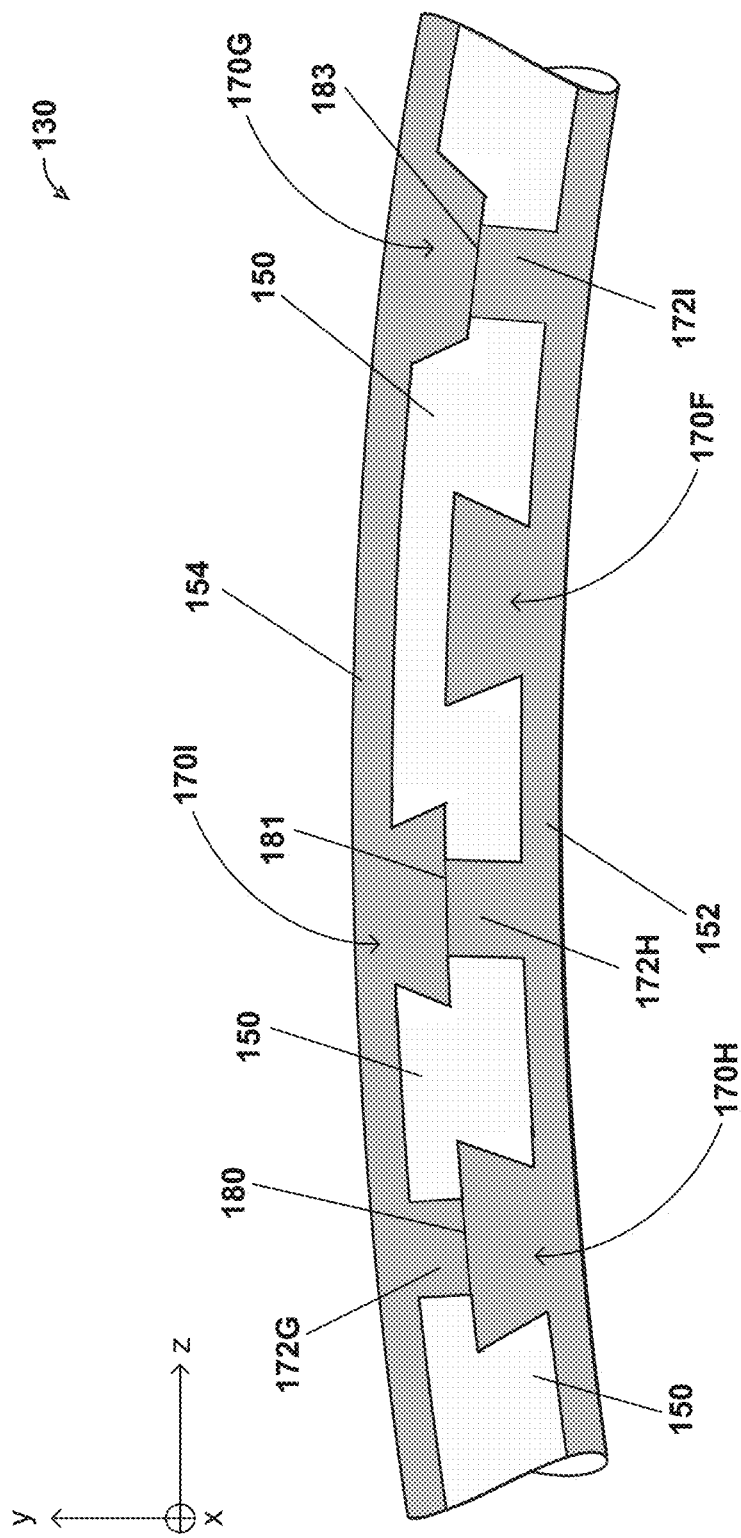
FIG. 6 is a conceptual diagram illustrating a partial view of a portion of another example independent friction member.

In some examples, the backing portion of the independent friction member can be constructed with through holes or recesses between the OD and ID (e.g., as shown in FIGS. 5 and 6) to eliminate or reduce the use of an adhesive bond joint to join the friction material to the backing portion, which normally have lower temperature capability than the friction material. This may cause the outer and inner friction materials to meld together and form a more homogenous friction liner combination with more thermally and mechanically robustness.

As will be described in further detail below, the examples of FIGS. 5 and 6 shows several ways to create a homogenous liner structure between the two friction material liner surfaces on the OD and on the ID of the independent friction member. Such examples may lock the two friction material liner surfaces to the backing support layer. Relatively small recesses (also referred to as channels or grooves) along the backing support layer's ID and OD cone surfaces may be used to carry the torque from the friction material liner during engagement. This may be done by using the recesses to form teeth to react the torque load. The backing support layer may also incorporate aperture features such as through holes or through slots or any variety of shapes to join both portions of the OD and ID friction material liners surfaces mechanically and may eliminate or reduce the need or importance of having an adhesive bond joint. In some examples, this may increase the temperature capability of the joint and allows more high energy engagements by eliminating the weak leak. As will be described below, the examples of FIG. 6 is an alternate way to lock the friction material liners to the backing support layer with a tapered channel approach. The tapered channel locks the friction liner material into the backing support layer by the use of the wedge shape.

Examples of the disclosure may provide an independent friction member with two friction surfaces, e.g., as compared to a design in which only one of the inner cone or outer cone includes a friction material liner at the interface between the inner and outer cone during engagement of the clutch assembly. In the case of a clutch assembly in an engaged configuration with an independent friction member, one friction material surface of the independent friction member may mate with the inner cone member and another one of the friction material surfaces mates with the outer cone member. For a clutch assembly with only a friction material on one of the inner or outer cone member, the differential speed at engagement for a conventional approach is simply the difference between the cup and cone speed when the engagement is initiated. Conversely, by employing an independent friction member, the differential speeds and relative velocities at each friction interface may be lowered during the engagement process when transitioning the clutch assembly from a disengaged configuration to engaged configuration. The independent friction member, when transitioning from a disengaged configuration to engaged configuration, may rotate at a speed that is approximately halfway between the inner cone member speed and the outer cone member speed. The differential speed reduction reduces the lining power by approximately half for each of the two friction material liner interfaces, reducing the friction surface temperatures and increasing liner wear life. The friction material liner life can also be traded for reduced clutch weight and size.

Examples of the present disclosure may provide for one or more benefits. For example, because the friction material liner may possess relatively high thermal resistance properties, heat dissipated during the engagement of the clutch assembly may go into both the inner and the outer cone members. Conversely, for a cone clutch assembly with only a single friction material liner, the heat may be primarily dissipated through only one cone member, since the friction material liner may resist heat transfer into the member for which it is attached. The additional heat sink provided by the other cone member with clutch assemblies including an independent friction member may reduce temperatures during operation and improves friction liner life.

Additionally, employing an independent friction member in a clutch assembly may allow the overall friction material liner thickness to be increased (e.g., approximately doubled) since it is attached or otherwise applied to two different surfaces of a underlying support layer. For clutch assemblies without an independent friction member, the friction material liner has limits relative to how thick it can be applied for a given surface. By attaching friction material liners to two different surfaces with an independent friction member design, the overall combined thickness of the friction material may be doubled or otherwise increased.

Additionally, by allowing the independent friction member to rotate independently when in a disengaged state (e.g., by the use of a bearing connection), wear on the friction liners from contacting either the clutch or cone axially during the disengaged state may be minimal, e.g., since there may be no clamp load to create significant axial forces and lubrication flow may be available to constantly lube the liner (e.g., in the case of a wet clutch design). In some examples, the independent friction member could contact either outer or inner cone member while disengaged but lubrication may be applied on each side of the independent friction member to address this. Such an approach may create a lubrication film thickness that will keep the members away from each other.

Figure 2:
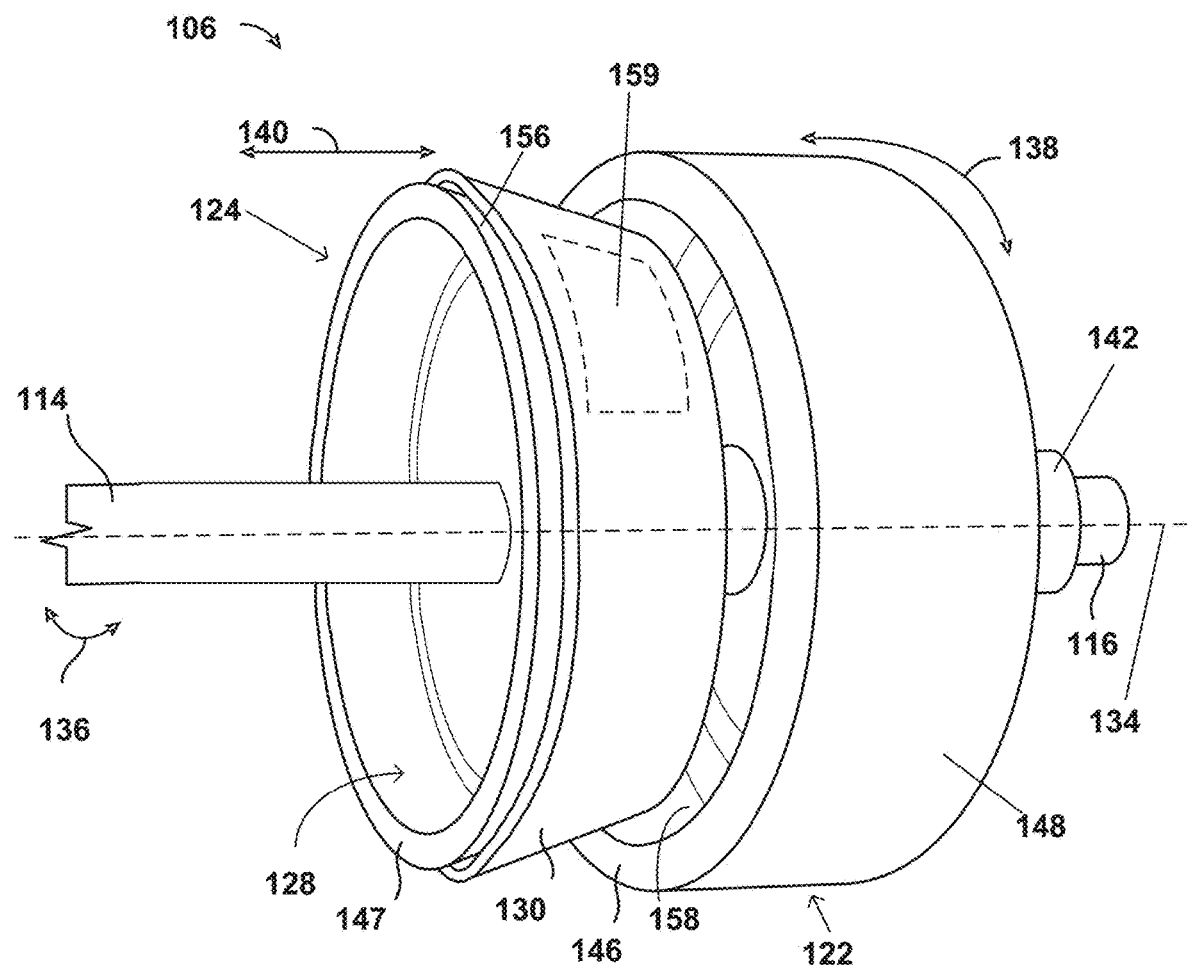
FIG. 2 is a conceptual diagram illustrating an example cone clutch assembly.

FIG. 1 is a conceptual diagram illustrating an example system 100 including cone clutch assembly 106. System 100 may include, for example, an engine 102, an accessory gearbox 104, cone clutch assembly 106, an accessory component 108 (accessory 108), and a controller 110. FIG. 2 is a conceptual diagram illustrating an example cone clutch assembly 106 that may be used in system 100. As will be described further below, clutch assembly 106 includes two cone clutch members 109 (individually shown as outer cone member 122 and inner cone member 124 in FIG. 2 for example). During the operation of a system such as system 100 that includes a cone clutch assembly coupled to an input shaft of an engine, one cone member of the clutch assembly may rotate whenever the engine is operating. This cone member may be either the inner cone or outer cone member. For ease of description, the examples are primarily described and shown with the inner cone member being such a rotating member, e.g., with the inner cone member being rotationally coupled to the input shaft, although examples of the disclosure include where the outer cone member is driven by an input shaft.

System 100 may include any suitable mechanical system. In some examples, system 100 may include at least a portion of a mechanical system of a vehicle powered by an internal combustion engine. In some examples, system 100 may include at least a portion of a mechanical system of an aircraft powered by a gas turbine engine. One example of a system that incorporate cone clutch assembly 106 may include a system in which an aircraft engine (such as a gas turbine engine) drives a reduction gearbox which drives the input into the clutch assembly and helicopter rotors. The clutch assembly may drive, when engaged, a reduction gearbox which drives a propeller to increase forward velocity of the helicopter.

Engine 102 is mechanically coupled to accessory gear box 104 via drive shaft 112. Engine 102 is configured to rotate (e.g., drive) drive shaft 112. Although illustrated as a gas turbine engine, in other example, engine 102 may include other devices configured to output shaft work, such as internal combustion engines, fuel cells, electric motors or generators, pneumatic motors, or hydraulic motors.

Drive shaft 112 may include any suitable shaft and/or gear system to transfer shaft work from engine 102 to accessory gear box 104. In examples in which engine 102 includes a gas turbine engine, drive shaft 112 may include an internal gearbox including a direct drive, a stub shaft drive, an idler shaft drive, or other mechanical coupling configured to drive a radial drive shaft or tower shaft. In some examples, drive shaft 112 may include an intermediate gearbox.

Accessory gearbox 104 is configured to transfer shaft work from drive shaft 112 to input shaft 114. In some examples, accessory gearbox 104 may include an accessory drive of a gas turbine engine system. Input shaft 114 is configured to drive one or more accessories of system 100. Although illustrated as a single input shaft 114, system 100 may include two or more input shafts driven by drive shaft 112 via accessory gearbox 104. For example, accessory gearbox 104 may include a plurality of spur gears mechanically coupling drive shaft 112 to respective input shaft of a plurality of input shafts 114, each at a selected gear ratio.

Input shaft 114 may be selectively coupled to an output shaft 116 via cone clutch assembly 106 so that output shaft 116 is rotationally driven by input shaft 114 when cone clutch assembly 106 is engaged and, conversely, when cone clutch assembly 106 is disengaged, output shaft 116 is not driven by input shaft 114. Input shaft 114 may be coupled (e.g., rotationally fixed) to inner cone member 124 (shown in FIG. 2) of clutch assembly 106, and outer cone member 122 (shown in FIG. 2) of clutch assembly 106 may be coupled (e.g., rotationally fixed) to output shaft 116. As used herein, the outer cone member 122 may also be referred to as a female cone member, and the inner cone member 124 may also be referred to as a male cone member. Although system 100 is described herein primarily with inner cone member 124 being fixed to input shaft 114 and with outer cone member 122 being fixed to output shaft 116, in other examples, inner cone member 124 may be fixed to output shaft 116 and outer cone member 122 may be fixed to input shaft 114. Output shaft 116 is mechanically coupled to accessory 108. Accessory 108 may include, for example, one or more of fuel pumps, generators, constant speed drives, oil pumps, hydraulic pumps, compressors, engine starters, tachometer sensor drives, and auxiliary gearbox drives. As noted above, in some examples, rather than driving an accessory, output shaft 116 may drive a propeller of a helicopter to increase the forwards velocity of the helicopter.

In some examples, system 100 may include at least one of rotational sensors 115 and 117. Rotational sensors 115 and 117 are configured to sense a rotational speed of input shaft 114 (or a cone member coupled to input shaft 114) and output shaft 116 (or the other cone member coupled to output shaft 116), respectively. For example, rotational sensors 115 and/or 117 may include one or more of a reflective sensor, an interrupter sensor, an optical encoder, a variable-reluctance sensor, an eddy-current killed oscillator sensor, a Wiegand sensor, or a Hall-effect sensor. In some examples, rotational sensors 115 and/or 117 may be configured to determine a rotation of input shaft 114 or output shaft 116, respectively, based on sensing a target disposed on input shaft 114 (or couple cone member) or output shaft 116 (or the other cone member). In some examples, controller 110 may be configured to receive signals from at least one of rotational sensors 115 or 117 and control, based on a rotational speed determined based on the signal, an electrical current applied to electromagnet 107.

In the example shown in FIG. 1, controller 110 may selectively engaged and disengage clutch assembly 106 as described herein, e.g., to selectively drive output shaft 116 via input shaft 114. For example, as described further below, controller 110 may control the axial position of outer cone member 122 relative to inner cone member 124, e.g., via an actuator. To engage clutch assembly 106, controller 110 may move inner cone member 124 towards outer cone member 122 to frictionally engage opposing surfaces of members 122, 124. Conversely, to disengage clutch assembly, controller 110 may move inner cone member 124 away from outer cone member 122 to frictionally disengage opposing surfaces of members 122, 124.

As described herein, independent friction member 130 may be located between the opposing friction surfaces of outer cone member 122 and inner cone member 124 such that the opposing friction surfaces of the cone members do not directly frictionally engage each other but instead are engage across friction member 130. Independent friction member 130 may not be directly mechanically attached to either inner cone member 124 or outer cone member 122, e.g., allowing the friction member to rotate freely from the inner and outer cone members 124, 122 when the cone members are not engaged with each other via friction member 130. In some examples, when the clutch assembly is not engaged, the independent friction member 130 may be caused to rotate by the rotation of inner cone member 124 driven by input shaft 114. In some examples, friction member 130 may be caused to rotate at substantially the same speed as inner cone member 124 when assembly 106 is in a disengaged configuration. In some examples, the speed of the rotation of friction member 130 and inner cone member 124 in the disengaged configuration may not be one to one. Rather, friction member 130 may be caused to rotate at a rotational speed that is less than inner cone member 124 driven by input shaft 114 (e.g., while outer cone member 122 is stationary). In this manner, the differential speed between outer cone member 122 and inner cone member 124 when transitioning to an engaged configuration may be less than if the inner cone member 124 and outer cone member 122 contacted each other directly when engaged. In some examples, whether or not the independent friction member spins independent of the inner or outer cone member or the same speed of either one of the members may be dependent on which part the independent friction member contacts when disengaged. Not until engagement will the speed be established by balancing the applied clamp load which create torque loads due to friction. The independent friction member may rub one of the cone members while disengaged which may impart rotation but wear should be low due to presence of oil or other lubricant and lack of significant clamp/torque loads.

Controller 110 may include, for example, a computing device, a desktop computer, a laptop computer, a workstation, a server, a mainframe, a cloud computing system, a tablet, a smart phone, or the like. Controller 110 is configured to control operation of system 100, including, for example, the position of outer cone member 122 relative to inner cone member 124. Controller 110 may be communicatively coupled to the various component of system 100 including, e.g., the actuator or other component configured to axially move inner cone member 124 relative outer cone member 122, sensors 115 and/or 117, and/or the like using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, controller 110 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Figure 3:
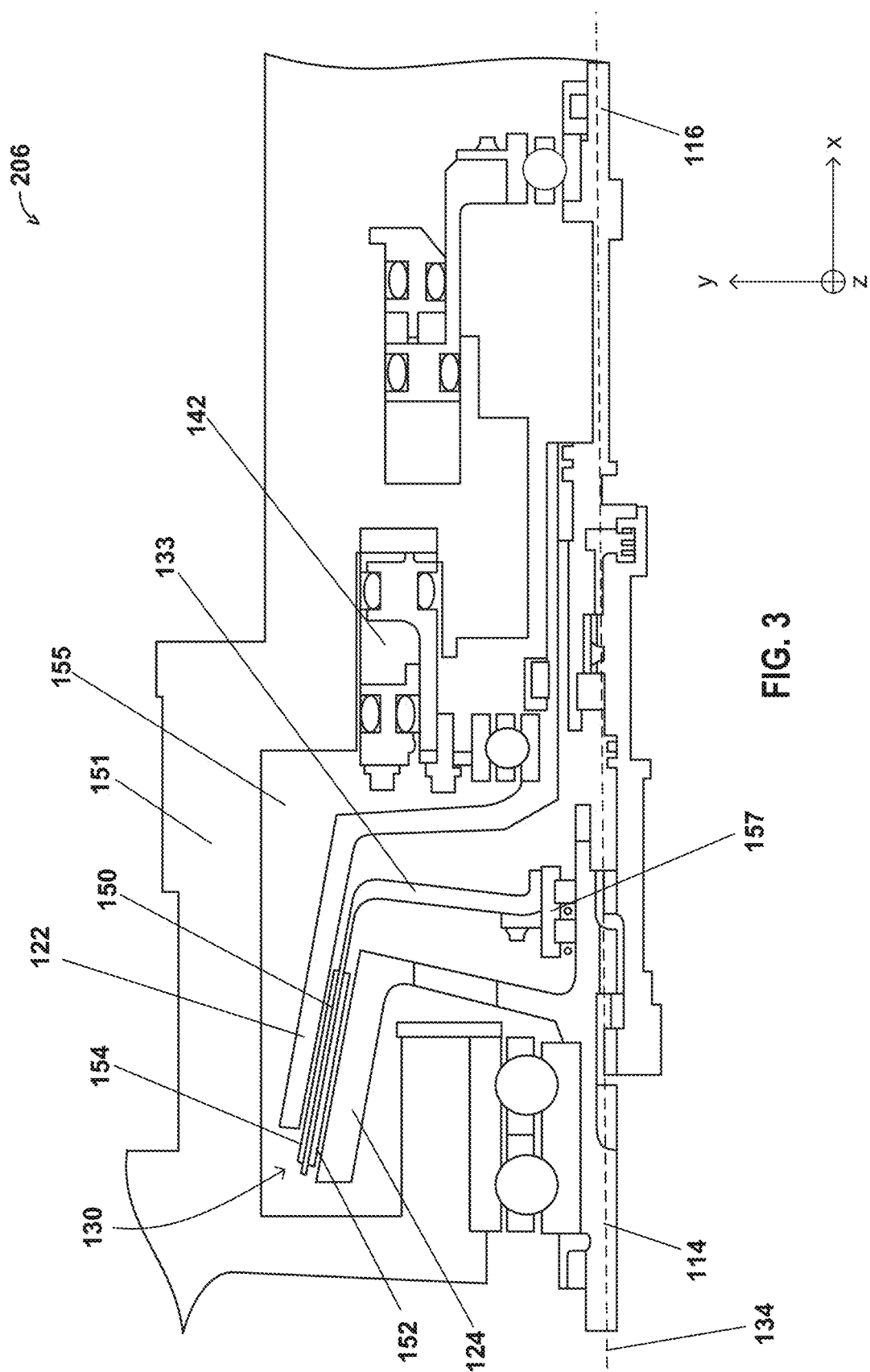
FIG. 3 is a conceptual diagram illustrating an example cone clutch assembly.

FIG. 2 is a conceptual diagram illustrating a perspective view an example cone clutch assembly 106 that may be used in system 100. FIG. 3 is a conceptual diagram illustrating a cross-sectional view of another example cone clutch assembly 206 that may be used in system 100. Assembly 206 may include similar features to assembly 106 of FIG. 2 and those features are similarly numbered.

Figure 4A:
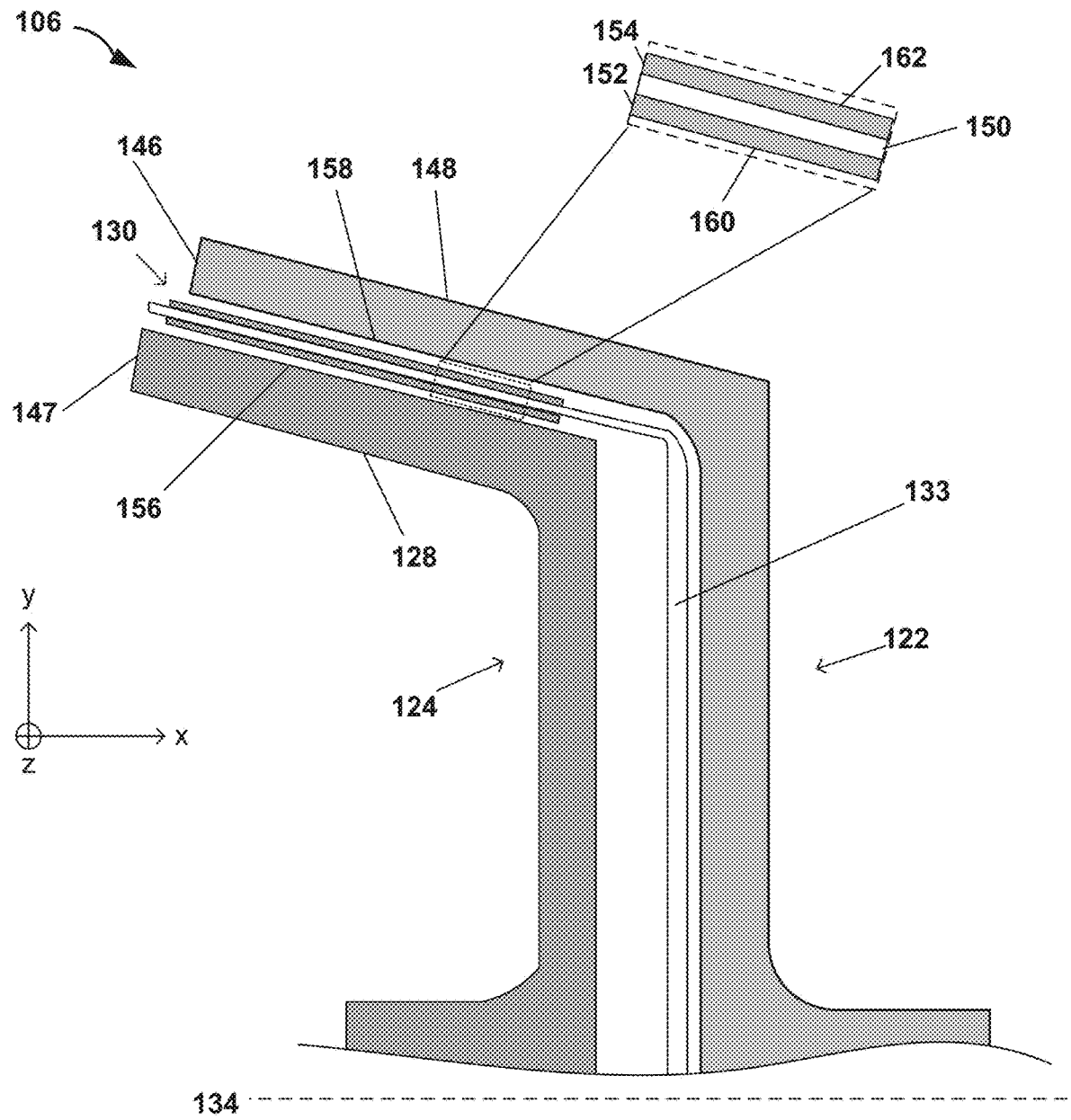
FIGS. 4A and 4B are simplified conceptual diagrams illustrating cross-sections of a portion of an example cone clutch assembly.
Figure 4B:
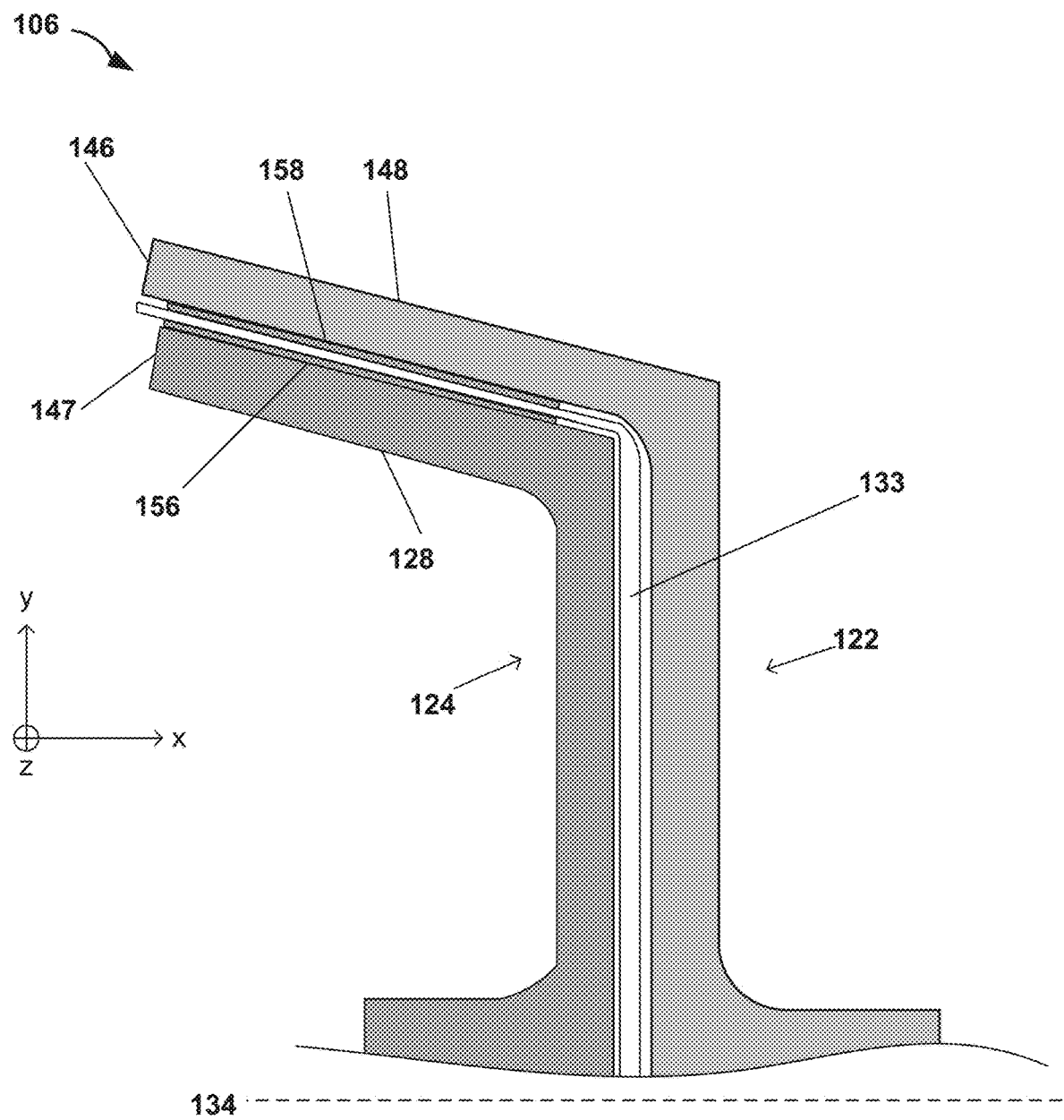

FIGS. 4A and 4B are conceptual diagrams showing a simplified cross-section of a portion of cone clutch assembly 206 in disengaged and engaged, respectively configurations. FIG. 5 is conceptual diagram illustrating a magnified view of a portion of friction member 130 (e.g., as shown in FIGS. 4A and 4B) showing an example geometry of backing support structure 150 of friction member 130 in further detail. While the examples of FIGS. 2-4B show examples in which inner cone member 124 is driven by output shaft 114, in other examples, outer cone member 122 may be driven by input shaft 114.

Cone clutch assembly 106 includes inner cone member 124 attached or otherwise fixed (e.g., rotationally fixed) to input shaft 114, and outer cone member 122 attached or otherwise fixed (e.g., rotationally fixed) to output shaft 116. Input shaft 114 and inner cone member 124 rotate about axis 134 in direction(s) 136. Likewise, outer cone member 122 and output shaft 116 rotate about axis 134 in direction(s) 138 when driven by input shaft 114, e.g., when clutch assembly 106 is in an engaged configuration.

Inner cone member 124 includes first friction surface 156 and inner surface 128 on the back side of first friction surface 156. Outer cone member 122 include second friction surface 158 and outer surface 148. Independent friction member 130 is positioned between first friction surface 156 and second friction surface 158 so that when clutch assembly 106 is engaged, first friction surface 156 and second friction surface 158 do not directly contact each other. Instead, first friction surface 156 and second friction surface 158 are each brought into contact with the respective opposing surfaces of independent friction member 130. For example, as better shown in FIG. 4A, friction member 130 defines a third friction surface 160 and a fourth friction surface 162. First friction surface 156 faces third friction surface 160, and second friction surface 158 faces fourth friction surface 162. When in an engaged configuration, first friction surface 156 contacts and frictionally engages third friction surface 160 and, likewise, second friction surface 158 contacts and frictionally engages fourth friction surface 162.

As shown in FIGS. 4A and 4B, with the generally conical shape, the friction surfaces of inner cone member 124 and outer cone member 122 are orientated at an angle relative to rotational axis 134 (which extends substantially parallel to the x-axis shown in FIGS. 3A and 3B) that is greater than zero and less than 90 degrees. The angle of the opposing friction surfaces of inner cone member 124 and outer cone member 122 may be generally the same so as to allow for relatively evenly distributed contact between the friction surface with the inner cone member 124 and outer cone member 122 are engaged with each other, e.g., as shown in FIG. 4B, across independent friction member 130.

Cone clutch assembly 106 is configured to be selectively transitioned between an engaged configuration and disengaged configuration. For example, inner cone member 124 is moveable relative to outer cone member 122 along translation direction 140 that is substantially parallel to rotational axis 134. For ease of illustration, clutch assembly 106 is shown in FIGS. 2, 3, and 4A in a disengaged configuration. To transition to an engaged configuration such as that shown in FIG. 4B, outer cone member 122 may be moved, e.g., under the control of controller 110, towards inner cone member 124 so that first friction surface 156 contacts and frictionally engages third friction surface 160 and, likewise, second friction surface 158 contacts and frictionally engages fourth friction surface 158.

Actuator 142 may be employed to selectively engage and disengage the clutch assembly. To engage the clutch assembly, actuator 142 may selectively apply an axial force to inner cone member 124 that moves outer cone member 122 towards inner cone member 124 so that first friction surface 156 contacts and frictionally engages third friction surface 160 and, likewise, second friction surface 158 contacts and frictionally engages fourth friction surface 158. The frictional engagement may allow for transfer of rotation between outer cone member 122 and inner cone member 124, e.g., so that input shaft 114 drives the rotation of output shaft 116. When engaged, the rotational speed of output shaft 116 may be approximately the same as input shaft 114 about axis 134. To disengage clutch assembly 106, the force applied by actuator 142 may be removed, e.g., under the control of controller 110, to allow for a gap or other frictional disengagement between the opposing friction surfaces 156, 160, 158, and 162. When disengaged, inner cone member 124 may rotate freely without rotating outer cone member 122.

Although not shown, clutch assembly 106 may be a wet clutch with a fluid being delivered to the friction surfaces of outer cone member 122 and inner cone member 124. In such an example, a fluid such as an oil may be present between first friction surface 156 and third friction surface 160 and, likewise, between second friction surface 158 and fourth friction surface 162 when clutch assembly 106 is disengaged like that shown in FIG. 4A. The fluid may be supplied to the cavity within a housing (e.g., cavity 155 formed by housing 151 in FIG. 3) that contains inner cone member 124, outer cone member 122, and friction member 130.

Any suitable actuator device may be used to move inner cone member 124 relative to outer cone member 122 along translation direction 140 to engage the respective cone members across friction member 130. For example, assembly 106 shown in FIG. 2 may include actuator 142 in the form of a spring or a hydraulic actuator to actuate the clutch assembly. In some examples, actuator 142 may operate on hydraulic pressure acting on a piston to actuate the clutch. The hydraulic piston pressure may be controlled by a controller 110 to control the pressure. The piston may have a rod side and a head side (pressure acts on both sides of the piston) to both actuate and retract the piston. Additionally, or alternatively, a spring may be used to selectively apply and/or remove the axial force acting on outer cone member 122. Like that of assembly 106, assembly 206 in FIG. 3 may include actuator 142 in the form of a clamp actuator piston, which actuates the clutch assembly between engaged and disengaged positions.

As shown in FIGS. 3, FIGS. 4A and 4B, independent friction member 130 includes backing support layer 150 with first layer of friction material 152 and second layer of friction material 154 on support layer 150, with backing support layer 150 being between first layer of friction material 152 and second layer of friction material 154. Backing support layer 150 may be a backing layer to support one or more layers of friction material, such as layers 152, 154. Radial arm 133 extends from backing support layer 150 radially toward input shaft 114. In such a configuration, friction member 130 may take the form of a truncated cone that is nested within inner cone member 124 and outer cone member 122, e.g., with a shape that is similar to that of inner cone member 124 and outer cone member 122.

Radial arm 133 of friction member 130 may be connected to input shaft 114 in a manner that maintains friction member 130 between inner cone 124 and outer cone 122, e.g., while allowing friction member 130 to rotate freely about rotational axis 134. For example, as shown in FIG. 3, assembly 206 may include bearing member 157 that attaches radial arm 133 to input shaft 114 in a manner that allows, using one or more bearings, friction member 130 to rotate about rotational axis 134, e.g., in the form of a support bearing that surrounds shaft 114 or other suitable bearing. As describe herein, by allowing friction member 130 to independently rotate about axis 134, the differential speed between outer cone member 122 and inner cone member 124 when transitioning to an engaged configuration with friction member 130 may be less (e.g., approximately half) than if inner cone member 124 and outer cone member 122 contacted each other directly when engaged. Bearing member 157 may be a separate member from that of radial arm 133, e.g., with radial arm 133 being attached by a suitable fastener to bearing member 157, or may be integrally formed as a part of radial arm 133. In some examples, bearing member 157 allows for axial movement of radial arm 133 and, thus, backing support layer 150 and friction layers 152, 154 between inner cone member 124 and outer cone member 122 when assembly 206 is not engaged, e.g., allowing friction member 130 to "slide" in position between inner cone member 124 and outer cone member 122 as well as rotate about axis 134. In some examples, a journal bearing or needle bearing may be employed in place of a roller bearing.

Backing support layer 150 and radial arm 133 may be constructed of any suitable material, such as a material with high temperature and high strength capabilities. In some examples, backing support layer 150 and radial arm 133 may be formed from a higher strength material such as steel or other metallic material compared to that of layers 152, 154. In some examples, backing support layer 150 and radial arm 133 may be formed of a case or core hardened material. Support layer 150 and radial arm 133 may be formed of the same material, e.g., when support layer 150 and radial arm 133 are integrally formed, or different materials.

Friction material layers 152, 154 may be formed of a material better suited as a friction material having desirable friction and wear resistance with less strength that support layer 150. Suitable friction materials for friction material layers 152, 154 may include bronze, carbon/carbon composites, Kevlar fiber encapsulated by a binder material or other friction tolerant materials to provide the clutch/friction function described herein. Layer 152 and layer 154 may be formed of the same or different friction materials. In some examples, the friction material may be capable of being formed around and through backing support layer 150 by a molding process such as compression molding.

As shown, e.g., in FIGS. 3, 4A and 4B, friction member 130 includes friction material layer 154 that engages second friction surface 158 of outer cone member 122 during engagement of assembly 106 and, similarly, includes friction material layer 152 that engages friction surface 156 of inner cone member 124 during engagement of assembly 106. As described herein, by employing the intermediately positioned friction member 130, multiple friction surfaces are defined by first friction layer 152 and second friction layer 154 rather than only having a single layer of friction material on either the surface of inner cone member 124 or outer cone member 122. This may allow for an increase in the surface area of friction surfaces when assembly 106 is engaged and an increase in the overall amount of friction material present in assembly 106.

Additionally, this may allow both inner cone member 124 and outer cone member 122 to function as heat sinks for heat generated by assembly 106 due to the frictional engagement of first and second friction layers 152, 154 with inner and outer cone member 122, 124. For example, because the friction material liner of layers 152, 154 may possess relatively high thermal resistance properties, heat dissipated during the engagement of the clutch assembly 106 may go into both the inner and the outer cone members 124, 122. Conversely, for a cone clutch assembly with only a single friction material liner, the heat may be primarily dissipated through only one cone member, since the friction material liner may resist heat transfer into the member for which it is attached. The additional heat sink provided by the other cone member with clutch assembly 106 including an independent friction member 130 may reduce temperatures during operation and improves friction liner life.

Additionally, employing independent friction member 130 in clutch assembly 106 may allow the overall friction material liner thickness (e.g., total combined thickness of first and second layers 152, 54) to be increased (e.g., approximately doubled) since it is attached or otherwise applied to two different surfaces of support layer 150. For clutch assemblies without an independent friction member, the friction material liner may have limits relative to how thick it can be applied for a given surface. By applying friction material liners to two different surfaces with the design of independent friction member 130, the overall combined thickness of the friction material may be doubled or otherwise increased.

Inner cone member 124 and outer cone member 122 may be formed of any suitable material such as a metal or metal alloy material. In some examples, inner cone member 124 and outer cone member 122 may be formed of steel. In some examples, the friction or rub surface of inner cone member 124 and outer cone member 122 may be hardened (e.g., via nitriding or carburizing) to improve the durability of inner cone member 124 and outer cone member 122.

First layer of friction material 152 and second layer of friction material 154 may have any suitable thicknesses (e.g., in the direction substantially orthogonal to the frictional engagement interface. The thicknesses may be the same or different from each other. In some examples, each of thickness may be substantially constant over the length of the respective layer, or one or more of thicknesses may vary in thickness, e.g., with portions being thicker and other portions being thinner. In some examples, the thickness of first layer 152 and second layer 154 may be about 0.045 inches but may be thicker or thinner. Backing support layer 150 may be any suitable thickness.

When clutch assembly 106 is in an engaged configuration, independent friction member 130 may rotate at substantially the same rate as inner cone member 124 and outer cone member 122, e.g., due to the friction engagement described above. When in the disengaged configuration, the speed of inner cone member 124 may be different from outer cone member 122 with inner cone member 124 being driven by input shaft 114, and with outer cone member 122 being substantially stationary or otherwise not driven by input shaft 114 across friction member 130.

When transitioning assembly 106 to an engaged configuration from a disengaged configuration, the driven member (inner cone member 124) will engage friction member 130 and outer cone member 122 across friction member 130, and will force friction member 130 to seek a rotational speed approximately half-way between inner cone member 124 and outer cone member 124, e.g., since torque is created at both cone members. Once the engagement is completed, all members (inner cone member 124, outer cone member 122, and friction member 130) will rotate at approximately the same speed. In this manner, when cone clutch assembly 106 is transitioned to the engaged configuration from the disengaged configuration with the inner cone member 124 rotating, the first differential speed between first friction surface 156 and third friction surface 160 and the second differential speed between second friction surface 158 and fourth friction surface 162 may each be less than the differential speed between first friction surface 156 and second friction surface 158, e.g., in cases in which first friction surface 156 and second friction surface 158 directly engage each other without friction member 130 being between first friction surface 156 and second friction surface 158. As noted herein, this approach may lower the differential speeds and relative velocities at each friction interface compared to systems without independent friction member 130 and direct contact between inner cone member 124 and outer cone member 122. Lower differential speeds may reduce the lining power at each interface and reduce the friction surface temperatures. In some examples, independent friction member 130 may rotate at a speed that is approximately midway between the inner cone member speed and the outer cone member speed. In general, such an approach may permit lower oil flows, and/or more compact designs for the clutch design.

First layer of friction material 152 and second layer of friction material 154 may be applied or otherwise attached to backing support layer 150, e.g., using any suitable technique. In some examples, first layer of friction material 152 and second layer of friction material 154 are removably attached to support layer 150 so that first layer of friction material 152 and/or second layer of friction material 154 may be removed and replaced when the friction material has been worn away beyond a threshold amount.

In some examples, an adhesive may be used to bond friction layers 152, 154 to the opposing surfaces of backing support layer 150. However, in some examples, some example adhesives may not be desirable for use in the high temperature environments that clutch assemblies 106, 206 may operate, e.g., as the adhesives may degrade at higher temperatures. As described herein, in addition to, or as an alternative to adhesives, backing support layer 150 may include one or more structural features that assist in applying or otherwise attaching first layer of friction material 152 and second layer of friction material 154 to backing support layer 150.

FIG. 5 is a conceptual diagram illustrating, from a perspective view, a portion of an example backing support layer 150 having example surface features in accordance with some examples of the disclosure. The portion of backing support layer 150 shown in FIG. 5 may be representative of the portion of friction member 130 indicated by dashed section 159 in FIG. 2 and is shown in FIG. 5 without a friction material (e.g., without first layer of friction material 152 and second layer of friction material 154) to better illustrate the geometry of the example. As shown in FIG. 5, this example of backing support layer, top surface 174 and bottom surface 176 each do not define a generally continuous planar surface. Rather, backing support layer 150 includes a plurality of recesses 170A-170E (collectively "recesses 170") into the respective surfaces 174, 176. For example, top surface 174 includes recesses 170A, 170B, and 170C, and bottom surface includes recesses 170D and 170E that extend into the surface plane to form grooves in the respective surfaces of backing support layer 150.

As will be shown in the examples of FIGS. 7 and 8, when fully assembled, a friction material such as first layer of friction material 152 and second layer of friction material 154 may fill recesses 170. Recesses 170 may function to lock or otherwise attach first layer of friction material 152 and second layer of friction material 154 to backing support layer 150 in a manner that carry torque from the friction material liner during engagement of clutch assembly 106 or 206. For example, recesses 170 may effectively form "teeth" in backing support layer 150 that react to the torque load applied to first layer of friction material 152 and second layer of friction material 154 during engagement of inner cone member 124 and outer cone member 122 across friction member 130. Recesses 170 may prevent shear force from sliding or otherwise detaching first layer of friction material 152 and/or second layer of friction material 154 for backing support layer, e.g., resulting from torque applied during engagement.

As shown in FIG. 5, recesses 170 are grooves or channel that do not extend all the way through backing support layer 150. In addition to, or as an alternative to recesses 170, backing support layer 150 may also include apertures (also referred to as "through holes") extending through the thickness of backing support layer 150. For example, as shown in FIG. 5, backing support layer 150 may include plurality of apertures such as apertures 172A-172F (collectively "apertures 172") that extend through backing support layer 150. As will be shown in FIGS. 7 and 8, when fully assembled, a friction material such as first layer of friction material 152 and second layer of friction material 154 may extend into apertures 172 and interface with each other to securely attach the two layers together. In other examples, a single friction member may be formed, e.g., molded, around the backing support layer 150, with portions extending through backing support layer 150 by way of apertures 172. Apertures 172 may allow for the joining of both top and bottom portions of the friction material layers 152, 154 surfaces mechanically, and may eliminate or reduce the need or importance of having an adhesive bond joint between the friction material layers 152, 154 and backing support layer 150. In some examples, this may increase the temperature capability of the joint and allows more high energy engagements by eliminating the weak leak resulting from an adhesive bond joint.

Recesses 170 and apertures 172 may have any suitable number of individual features, size and shape, e.g., that allows for the function described herein, e.g., in the form of torque loading and attachment to backing support layer 150. In FIG. 5, apertures 172A and 172D have an elongated oval shape extending to the surface of backing support layer 150 while apertures 172B, 172C, 172E, and 172F have generally circular shapes. Other shapes, such as slots or any other shapes that allow the two friction material layers 152, 154 to meld together through these openings, are contemplated. Apertures 172 are shown being located within one of the individual recesses 170. In other examples, one or more of apertures 172 may be located at a point not within one of recesses 170 but extend through backing support layer 150 through its greatest thickness. In other examples, backing support layer 150 may only include apertures 172 and no recesses 170, or vice versa.

In the example shown in FIG. 5, recesses 170 each have side walls that extend at generally a 90 degrees angle to the surface. In other examples, one or both of the side walls for one or more of recesses 170A-170E may have an undercut configuration (e.g., in a dovetail configuration) to provide additional mechanical interlock for a friction material applied to backing support layer 150.

Recesses 170 and/or apertures 172 may be uniformly distributed over the entirety of backing support layer 150 (or at least for the portions that interface with friction material, such as, friction material layers 152, 154. In other examples, these structural features may be non-uniformly distributed. For example, apertures 172 and/or recesses 170 may be more prevalent in areas of backing support layer 150 where more torque occurs during engagement of friction member 130 and less prevalent in areas where less torque occurs during engagement. In some examples, recesses 170 and/or apertures 172 may extend the entire axial length and/or circumferential length of backing support layer 150 while in other examples recesses 170 and/or apertures 172 may extend only a portion of the entire axial length and/or circumferential length. Recesses 170 may extend any suitable depth into the surface of backing support layer 150 and may have any suitable width.

FIGS. 6 and 7 are conceptual diagrams illustrating cross-sections views of portions of example of friction members, like friction member 130 described for FIGS. 2-5, with like features being similarly numbered. The cross-section is orthogonal to the rotational axis 134 and only shows a discrete circumferential length of friction member 130 including backing support layer 150 and first friction material layer 152 and second friction material layer 154.

In the example of FIG. 6, backing support layer 150 includes both recesses such as recesses 170E-170I, and apertures such as apertures 172G-172I. On the far left, aperture 172G is aligned with a portion of recess 170H. First layer of friction material 152 is in contact with second layer of friction material 154 within aperture 172G along interface 180. In some examples, friction material 152 is bonded with an adhesive to friction material 154 at interface 180, e.g., in cases with operating temperatures of the cone clutch assembly being lower than the degradation temperature of the adhesive. The multiple interfaces formed by multiple apertures in backing support layer 150 may be used to meld the friction materials together to lock them onto the conical backing support layer 150 via this attachment. In some examples, first friction material layer 152 and second friction material layer 154 may be attached by rivets and/or other suitable mechanical fasteners, e.g., with the rivet or other fasteners extending through the respective apertures or directly to the friction support layer 150. A similar arrangement is shown for aperture 172H and recess 170I with first layer of friction material 152 being in contact with second layer of friction material 154 within aperture 172H along interface 181. A similar arrangement is shown for aperture 172I and recess 170G with first layer of friction material 152 being in contact with second layer of friction material 154 within aperture 172H along interface 183.

In the example of FIG. 6, recesses 170H and 170F have an undercut configuration to provide a dovetail-like joint between first layer of friction material 152 and backing support layer 150. This configuration may provide for mechanical attachment between first layer of friction material 152 and backing support layer 150. Recess 170I is similarly configured for mechanical attachment between second layer of friction material 154 and backing support layer 150. Recess 170G is another example recess that has an open configured with walls tapering into the recess rather than the undercut configuration of the other recesses. As will be described further below, apertures 172G-172I may be formed as elongated slots, circular holes, and/or other suitably shapes holes through backing support layer 150. In some examples, such holes may be shaped like a rivet, e.g., for rivet attachment through the hole.

In the example of FIG. 7, the recesses and apertures (only recess 170J and aperture 172J are labelled) are generally uniformly distributed along the cross-section of friction member 130, e.g., with backing support layer 150 in the form of a uniform mesh. The recesses alternate from top to bottom moving circumferentially, with the apertures being positioned within the recesses. First friction material layer 152 and second friction material layer 154 are positioned within respective recesses in backing support layer 150 and interface with each within the apertures, e.g., as described with regard to the example of FIG. 6. Like FIG. 6, the apertures in the example of FIG. 7 may be formed as elongated slots, circular holes, and/or other suitably shapes holes through backing support layer 150. In some examples, such holes may be shaped like a rivet, e.g., for rivet attachment through the hole.

Although FIGS. 6 and 7 show examples in which the friction material of friction member 130 includes two different friction material layers, in the form of first friction material layer 152 and second friction material layer 154, applied to backing support layer 150, in other examples, a single piece of friction material may be molded or otherwise applied around backing support layer 150 and through the apertures formed in backing support layer 150, as described above. For example, the friction material may be formed around and through the apertures in backing support layer 150 using any suitable molding process, e.g., to allow for a single integral friction material surrounding the backing support layer 150 in the place of first friction material layer 152 and second friction material layer 154 shown in the illustrated examples. Example molding processes may include compression molding, vacuum penetration infiltration (VPI), or the like. In some examples, the friction material liner(s) is/are molded into the dovetail (or other aperture shapes such as that described herein) using pressure and the allowed to take a set to lock the friction material into place. In addition to, or as an alternative to molding, friction material layers 152, 154 may be attached to backing support layer 150, e.g., across apertures 172, by rivets or other mechanical fasteners or adhesives, e.g., either within apertures 172 or directly to backing support layer 150. Friction material layers 152, 154 may be attached via rivets, adhesive, and/or molding them tighter via the apertures in backing support layer 150, or mechanically locking it to the backing support layer with a feature such as a dovetail (or other aperture/recess configuration described herein). In the case of recesses 170H, 170I, and 170F and apertures 172G and 172H in backing support layer 150 in FIG. 6, the friction material may be molded into the dovetails using pressure and the allowed to take a set to lock it into place.

In some of the examples described herein, backing support layer 150 includes at least one aperture such as apertures 172 extending through the backing support layer. The first layer of friction material 152 and the second layer of friction material 154 may be in contact via the apertures 172. Apertures 172 may allow first friction material layer 152 and second friction material layer 154 to be melded together to each other and potentially can eliminate the need for bonding (e.g., adhesive bonding) the friction material to backing support layer 150. This approach may provide a higher temperature capable structure to assure the liner material does not debond during operation of the cone clutch assembly at high temperatures.

In some of the examples described herein, backing support layer 150 includes at least one recess such as recesses 170. The first layer of friction material 152 and/or the second layer of friction material 154 may be located within the recesses 170. In such a configuration, the recesses may function to carry torque to eliminate shear forces on the friction material and may lock in the liner relative to the backing support layer, e.g., with dovetail type or other mechanically locking configuration. In some examples, recesses 170 may eliminate the need for a bond joint (adhesive bond) between the friction material and backing support layer.

Figure 8A:
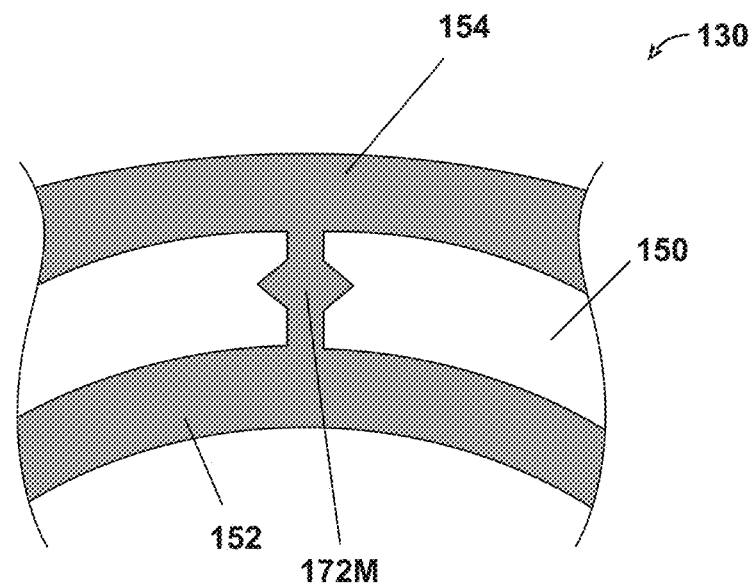
FIGS. 8A-8C are conceptual diagrams illustrating partial view of examples portions of other example independent friction members.
Figure 8B:
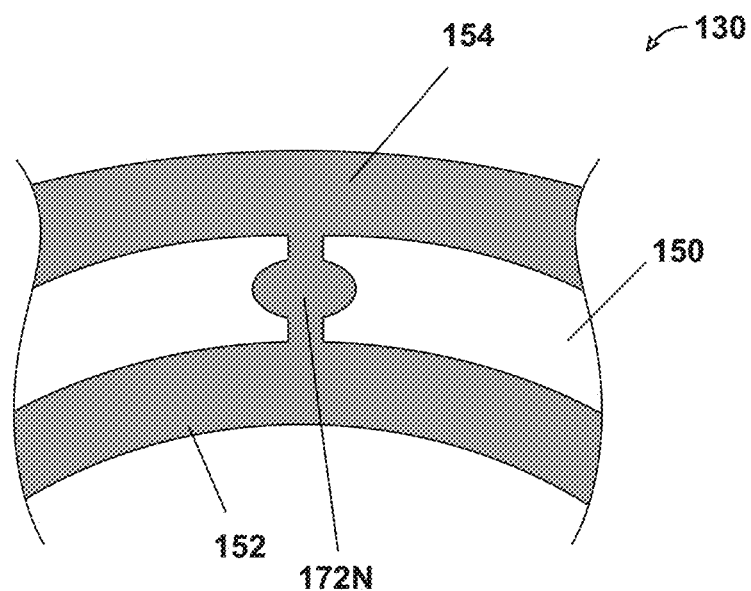
Figure 8C:
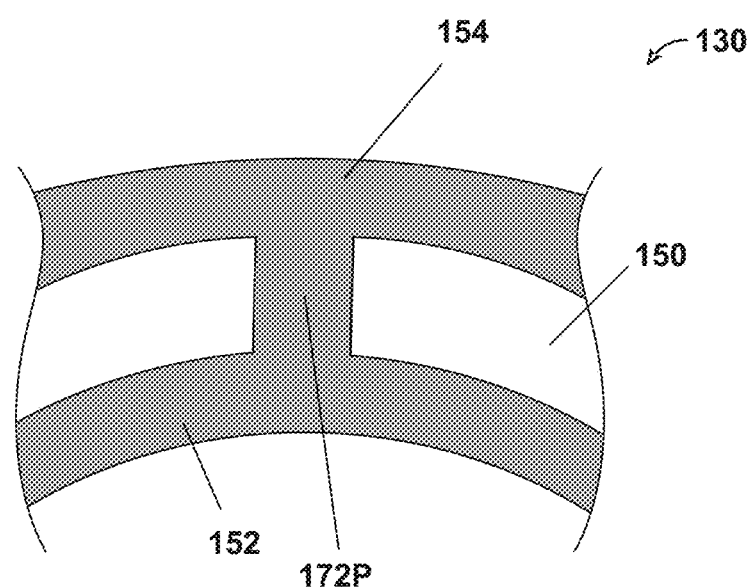
Figure 9A:
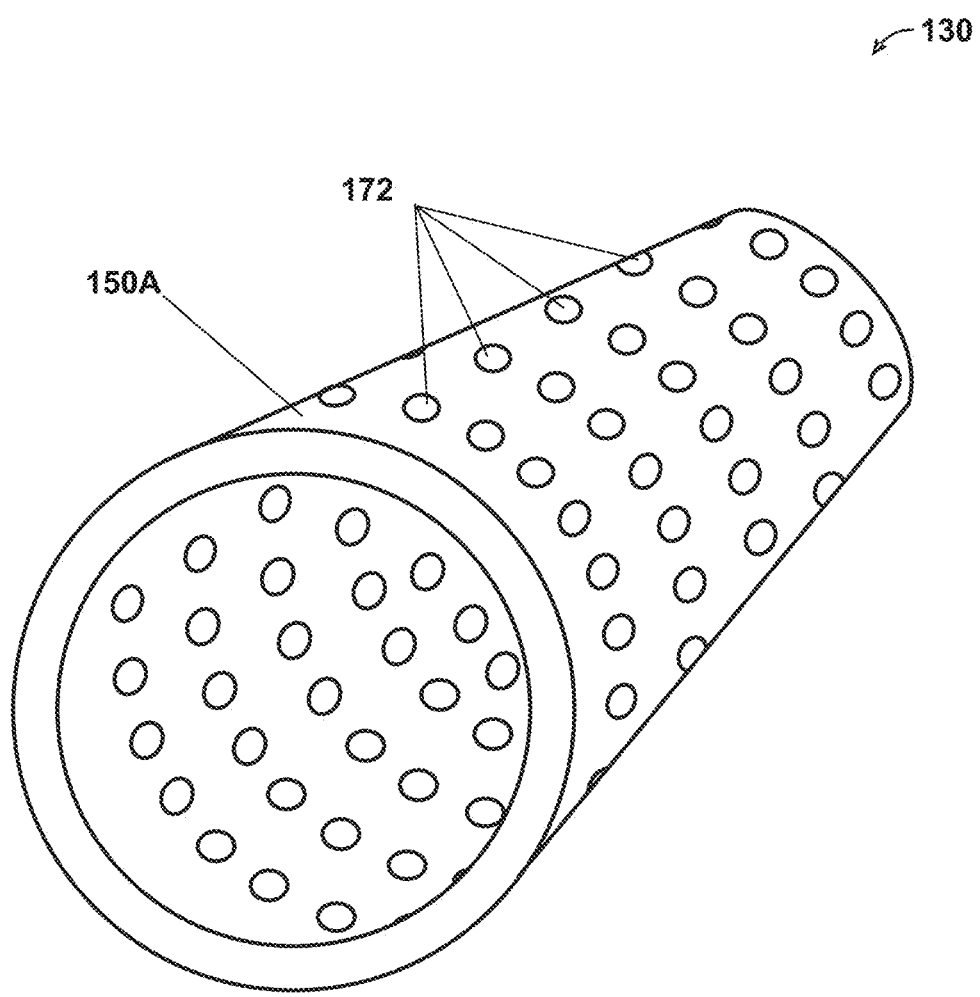
FIGS. 9A-9C are conceptual diagrams illustrating example backing support layers for various independent friction members.
Figure 9B:
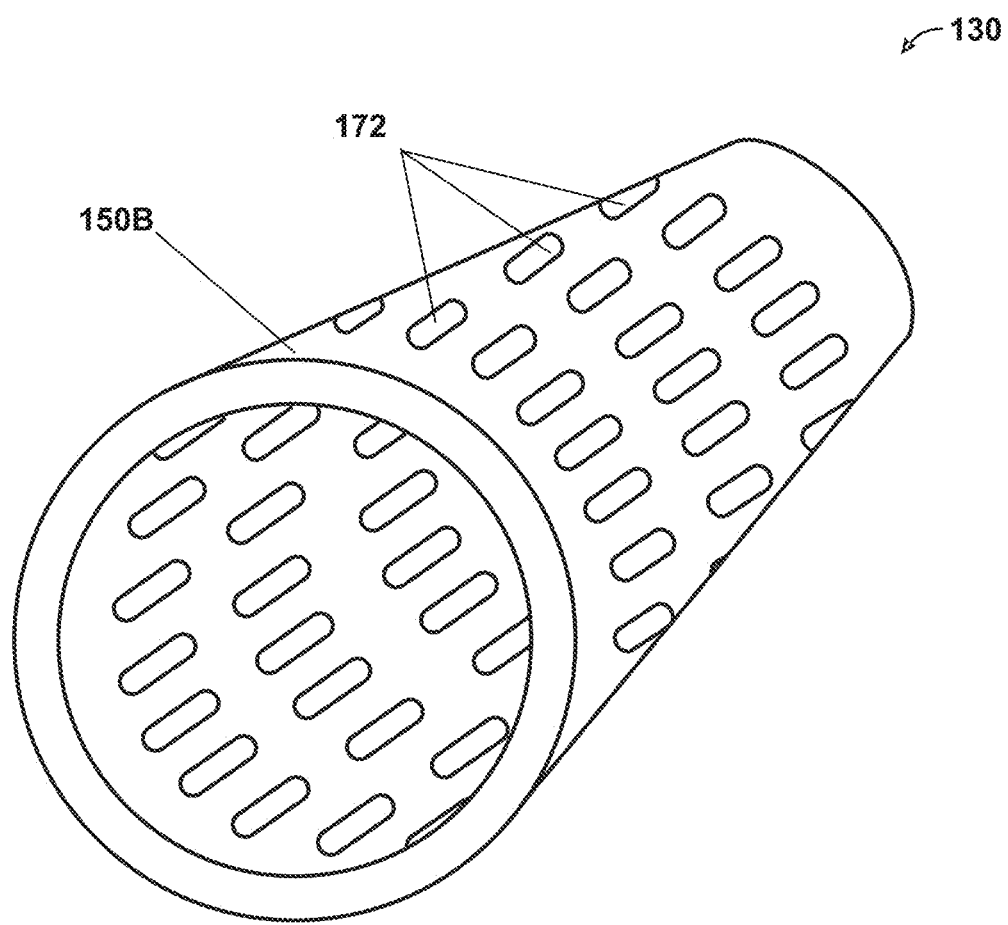
Figure 9C:
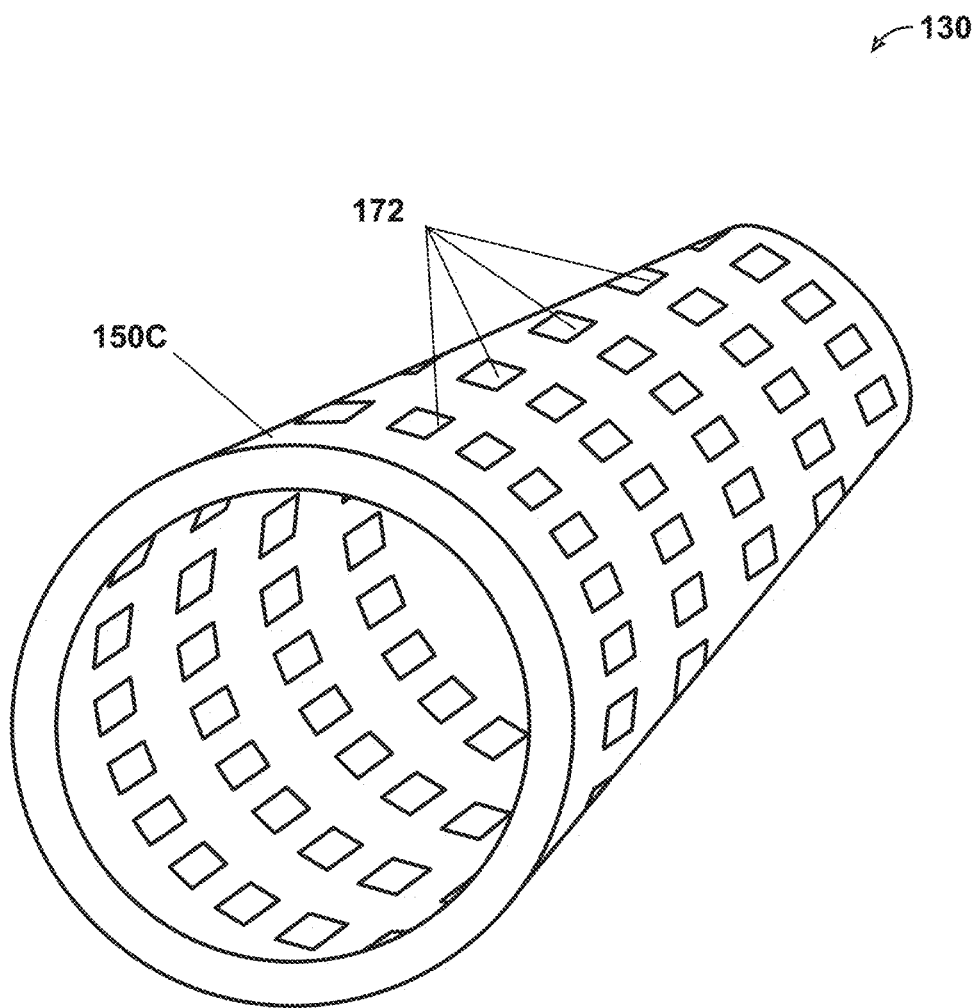

FIGS. 8A-8C are conceptual diagrams illustrating cross-sections views of portions of example of friction members, like friction member 130 described for FIGS. 2-7, with like features being similarly numbered. The cross-section is orthogonal to the rotational axis 134 and only shows a discrete circumferential length of friction member 130 including backing support layer 150 and first friction material layer 152 and second friction material layer 154. Each of the examples shown in FIGS. 8A-8C show different configurations for locking in friction materials 152 and 154 to each other and/or to backing support layer 150. For example, FIG. 8A shows an example aperture 172M through backing support layer 150 having an inverted dovetail configuration. FIG. 8B shows an example aperture 172N through backing support layer 150 having a similar inverted configuration but with a circular shape rather than the diamond or rectangular shape of the inverted dovetail shown in FIG. 8B. FIG. 8C shows an example configuration in which aperture 172 is a straight through hole in back support layer 150. Each of the example apertures may have any suitable shape into the backing support layer 150, e.g., a circular shape, elongated slot, or other desired shape. FIGS. 9A-9C show example shapes of the apertures into the backing support layer 150.

The example configurations of FIGS. 8A-8C may be employed for any of the apertures formed in example backing support layer described herein. The apertures may allow friction material layers 152 and 154 to be compressed within the holes in the backing support layer 150, e.g., during a molding process used to form the friction material either as two layers or a single integral friction member on either side of backing support layer 150. In the examples of FIGS. 8A and 8B, the inverted dovetail or circular feature may provide an additional mechanism for locking the liners in place (e.g., relative to backing support layer 150) and react the torque applied to the friction materials during engagement of the cone clutch assembly (e.g., in addition to the friction material(s) being molded together across the respective apertures in backing support layer 150).

FIGS. 9A-9C are conceptual diagrams illustrating example backing support layers 150A-150C for various independent friction members, such as one or more of the various example independent friction members 130 described above. For ease of illustration, each backing support layer 150A-150C is shown without friction material being applied. Backing support layers 150A-150C each have a plurality apertures (including respective apertures 172) formed through the backing support layer in a mesh or grid like pattern repeating around the circumference, e.g., as the backing support layer 150 tapers from a larger diameter opening to a smaller diameter in a conical manner. In the example of FIG. 9A, apertures 172 have a circular shape forming a grid pattern on backing support layer 150A. In the example of FIG. 9B, apertures 172 have an elongated shape, e.g., in the form of slots, forming a grid pattern on backing support layer 150B. In the example of FIG. 9C, apertures 172 have a rectangular (e.g., square) shape, forming a grid pattern on backing support layer 150C. Although in each examples, all the shapes are the same, in other examples, a backing support layer may include multiple apertures having a variety of shapes. The examples configurations in FIGS. 9A-9C may incorporate axial slots, dovetails, or any other examples through hole configurations in FIGS. 6-8C in the backing support member surface. The apertures may form a grid in the backing support layer to provide a pass thru for the friction liner material in backing support layer 150, e.g., to bond each friction materials on either side of backing support layer 150 to each other, e.g., such as layers 152 and 154. Apertures 172 shown in FIGS. 9A-9C may have any suitable dimensions for the described shapes.

Figure 10:
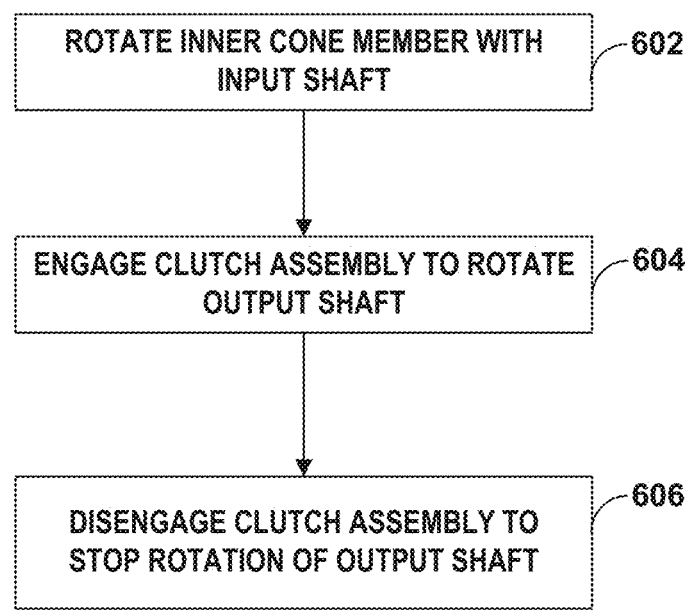
FIG. 10 is a flow diagram illustrating an example technique for operating a system including a cone clutch assembly in accordance with some examples of the disclosure.

FIG. 10 is a flow diagram illustrating an example technique for controlling engagement of an engine with an accessory using a cone clutch assembly. Using the technique of FIG. 10, controller 110 may control system 100 to selectively transfer rotational motion from accessory gear box 104 to accessory component 108 via clutch assembly 106 as described herein. For ease of description, the example of FIG. 10 will be described with regard to system 100 and cone clutch assembly 106 described above with regard to FIGS. 2, and 4A, 4B. However, the technique may be used to control other systems and clutch assemblies including assembly 206 of FIG. 3. Additionally, system 100 and cone clutch assembly 106 may be controlled using other techniques.

The technique illustrated in FIG. 10 may include rotating inner cone member 124 around rotational axis 134 by the rotation of input shaft 114 (602). As discussed above, engine 102 may be configured to rotate input shaft 114, e.g., via drive shaft 112, accessory gear box 104, and input shaft 114. Outer cone member 122 may be disengaged from inner cone member 124 during the rotation of inner cone member 124, e.g., with actuator 142 not applying an axial force that forces first friction face 152 of inner cone member 124 against third surface 160 of friction member 130, and second friction face 158 of outer cone member 122 against fourth surface 162 of friction member 130.

Controller 110 may then selectively engage clutch assembly 106 to transfer rotational motion from input shaft 114 to output shaft 116, e.g., to drive accessory 108 (604). For example, controller 110 may actuate actuator 142 to apply an axial force to outer cone member 122 that moves outer cone member 122 towards inner cone member 124 so that first friction face 152 of inner cone member 124 engages third surface 160 of friction member 130, and second friction surface 158 of outer cone member 122 engages fourth surface 162 of friction member 130. The applied force may allow for frictional engagement between the four opposing friction surfaces. The frictional engagement may allow for transfer of rotation between outer cone member 122 and inner cone member 124, e.g., so that input shaft 114 drives the rotation of output shaft 116. Advantageously, the differential speed between outer cone member 122 and inner cone member 124 when transitioning to an engaged configuration may be less than if the inner cone member 124 and outer cone member 122 contacted each other directly when engaged. At some later point, controller 110 may disengage clutch assembly 106 to stop driving the rotation of output shaft 116, e.g., by moving outer cone member 122 axially away from inner cone member and independent friction member 130 (606). In some examples, controller 110 may operate to fill a piston cavity with fluid to either disengage or engage inner cone member 124 from outer cone member 122 (e.g., with fluid being delivered to either side of plunger in a piston cavity). The may allow for force to be applied in two directions with one direction applying an engagement force and the other direction applying a disengagement force.

Various examples have been described. These and other examples are within the scope of the following clauses and claims.

Clause 1. A cone clutch assembly comprising: an inner cone member configured to be rotationally coupled to a first shaft, the inner cone member defining a first friction surface; an outer cone member configured to be rotationally coupled to a second shaft, the outer cone member defining a second friction surface opposing the first friction surface; and an independent friction member positioned between the first friction surface of the inner cone member and the second friction surface of the outer cone member, wherein the inner cone member and outer cone member are configured to be selectively engaged and disengaged from each other, wherein, when the inner cone member is engaged with the outer cone member, the first friction surface of the inner cone member frictionally engages a third friction surface of the friction member, and the second friction surface of the outer cone member engages a fourth friction surface of the friction member such that rotational motion is transferred between the inner cone member and the outer cone member via the friction member.

Clause 2. The clutch assembly of clause 1, wherein the independent friction member includes a backing support layer and a radial arm, wherein the radial arm is connected to one of the first shaft or the second shaft by a bearing assembly, and wherein the bearing assembly allows the independent friction member to rotate about the one of the first shaft or the second shaft independent of the inner cone member and outer cone member when disengaged from each other.

Clause 3. The clutch assembly of clause 1, wherein the independent friction member includes a first layer of friction material, a second layer of friction material, and a backing support layer between the first layer of friction material and the second layer of friction material, and wherein the first layer of friction material defines the third friction surface, and wherein the second layer of friction material defines the fourth friction surface.

Clause 4. The clutch assembly of clause 3, wherein the backing support layer includes at least one aperture extending through the backing support layer, and wherein the first layer of friction material and the second layer of friction material are in contact via the at least one aperture.

Clause 5. The clutch assembly of any one of clauses 3 or 4, wherein the backing support layer includes at least one recess in the backing support layer, and wherein at least one of the first layer of friction material or the second layer of friction material is located within the at least one recess.

Clause 6. The clutch assembly of clause 5, wherein the at least one recess has an undercut wall configuration to mechanically attach the first layer of friction material to the backing support layer.

Clause 7. The clutch assembly of any one of clauses 2-6, wherein the backing support layer includes a plurality of apertures extending through the backing support layer.

Clause 8. The clutch assembly of any one of clauses 2-7, wherein the backing support layer includes a plurality of recessed formed into the back support layer.

Clause 9. The clutch assembly of clause 1, wherein the independent friction member includes a layer of friction material and a backing support layer within the layer of friction material, and wherein the layer of friction material defines the third friction surface, and wherein the second layer of friction material defines the fourth friction surface.

Clause 10. The clutch assembly of clause 9, wherein the backing support layer includes at least one of an aperture extending through the backing support layer or a recess formed in the back support layer.

Clause 11. The clutch assembly of clause 9 or 10, wherein the layer of friction material is molded to both an inner surface and an outer surface of the backing support layer.

Clause 12. The clutch assembly of any one of clause 1-11, wherein the backing support layer includes a metallic layer.

Clause 13. The clutch assembly of any one of clauses 1-12, further comprising a controller including control circuitry, wherein the controller is configured to selectively engage and disengage the inner cone member and the outer cone member from each other.

Clause 14. The clutch assembly of any one of clauses 1-13, wherein, when the inner cone member transitions from a disengaged configuration to an engaged configuration with the outer cone member, the first friction surface of the inner cone member frictionally engages a third friction surface of the friction member at a first differential speed, and the second friction surface of the outer cone member engages a fourth friction surface of the friction member at a second differential speed, and wherein the first differential speed and the second differential speed are both less than a third differential speed between the inner cone member and the outer cone member.

Clause 15. A method of operating a cone clutch assembly, the method comprising engaging an inner cone member with the outer cone member with an independent friction member positioned between the first friction surface of the inner cone member and the second friction surface of the outer cone member, wherein the inner cone member is rotationally coupled to a first shaft and defines a first friction surface, wherein the outer cone member is rotationally coupled to a second shaft and defines a second friction surface, wherein, when the inner cone member is engaged with the outer cone member, the first friction surface of the inner cone member frictionally engages a third friction surface of the friction member, and the second friction surface of the outer cone member engages a fourth friction surface of the friction member such that rotational motion is transferred between the inner cone member and the outer cone member via the friction member.

Clause 16. The method of clause 15, wherein the independent friction member includes a backing support layer and a radial arm, wherein the radial arm is connected to one of the first shaft or the second shaft by a bearing assembly, and wherein the bearing assembly allows the independent friction member to rotate about the one of the first shaft or the second shaft independent of the inner cone member and outer cone member when disengaged from each other.

Clause 17. The method of clause 15, wherein the independent friction member includes a first layer of friction material, a second layer of friction material, and a backing support layer between the first layer of friction material and the second layer of friction material, and wherein the first layer of friction material defines the third friction surface, and wherein the second layer of friction material defines the fourth friction surface.

Clause 18. The method of clause 17, wherein the backing support layer includes at least one aperture extending through the backing support layer, and wherein the first layer of friction material and the second layer of friction material are in contact via the at least one aperture.

Clause 19. The method of any one of clauses 17 or 18, wherein the backing support layer includes at least one recess in the backing support layer, and wherein at least one of the first layer of friction material or the second layer of friction material is located within the at least one recess.

Clause 20. The method of clause 19, wherein the at least one recess has an undercut wall configuration to mechanically attach the first layer of friction material to the backing support layer.

Clause 21. The method of any one of clauses 16-20, wherein the backing support layer includes a plurality of apertures extending through the backing support layer.

Clause 22. The method of any one of clauses 16-21, wherein the backing support layer includes a plurality of recessed formed into the back support layer.

Clause 23. The method of clause 15, wherein the independent friction member includes a layer of friction material and a backing support layer within the layer of friction material, and wherein the layer of friction material defines the third friction surface, and wherein the second layer of friction material defines the fourth friction surface.

Clause 24. The method of clause 23, wherein the backing support layer includes at least one of an aperture extending through the backing support layer or a recess formed in the back support layer.

Clause 25. The method of clause 23 or 24, wherein the layer of friction material is molded to both an inner surface and an outer surface of the backing support layer.

Clause 26. The method of any one of clause 15-25, wherein the backing support layer includes a metallic layer.

Clause 27. The method of any one of clauses 15-26, further comprising selectively engaging and disengaging, under the control of control circuitry, the inner cone member and the outer cone member from each other.

Clause 28. The method of any one of clauses 15-27, wherein, when the inner cone member transitions from a disengaged configuration to an engaged configuration with the outer cone member, the first friction surface of the inner cone member frictionally engages a third friction surface of the friction member at a first differential speed, and the second friction surface of the outer cone member engages a fourth friction surface of the friction member at a second differential speed, and wherein the first differential speed and the second differential speed are both less than a third differential speed between the inner cone member and the outer cone member.

What is claimed is:

1. A cone clutch assembly comprising:
    an inner cone member configured to be rotationally coupled to a first shaft, the inner cone member defining a first friction surface;
    an outer cone member configured to be rotationally coupled to a second shaft, the outer cone member defining a second friction surface opposing the first friction surface; and
    an independent friction member positioned between the first friction surface of the inner cone member and the second friction surface of the outer cone member,
    wherein the inner cone member and outer cone member are configured to be selectively engaged and disengaged from each other,
    wherein, when the inner cone member is engaged with the outer cone member, the first friction surface of the inner cone member frictionally engages a third friction surface of the friction member, and the second friction surface of the outer cone member engages a fourth friction surface of the friction member such that rotational motion is transferred between the inner cone member and the outer cone member via the friction member,
    wherein the independent friction member includes a backing support layer and a radial arm, wherein the radial arm is connected to one of the first shaft or the second shaft by a bearing assembly, and wherein the bearing assembly allows the independent friction member to rotate about the one of the first shaft or the second shaft independent of the inner cone member and outer cone member when disengaged from each other.

2. The clutch assembly of claim 1, wherein the independent friction member includes a first layer of friction material, a second layer of friction material, and the backing support layer between the first layer of friction material and the second layer of friction material, and wherein the first layer of friction material defines the third friction surface, and wherein the second layer of friction material defines the fourth friction surface.

3. The clutch assembly of claim 2, wherein the backing support layer includes at least one aperture extending through the backing support layer, and wherein the first layer of friction material and the second layer of friction material are in contact via the at least one aperture.

4. The clutch assembly of claim 2, wherein the backing support layer includes at least one recess in the backing support layer, and wherein at least one of the first layer of friction material or the second layer of friction material is located within the at least one recess.

5. The clutch assembly of claim 4, wherein the at least one recess has an undercut wall configuration to mechanically attach the first layer of friction material to the backing support layer.

6. The clutch assembly of claim 1, wherein the backing support layer includes a plurality of apertures extending through the backing support layer.

7. The clutch assembly of claim 1, wherein the backing support layer includes a plurality of recesses formed into the backing support layer.

8. The clutch assembly of claim 1, wherein the independent friction member includes a layer of friction material, the backing support layer being within the layer of friction material, and wherein the layer of friction material defines the third friction surface, and the fourth friction surface.

9. The clutch assembly of claim 8, wherein the backing support layer includes at least one of an aperture extending through the backing support layer or a recess formed in the backing support layer.

10. The clutch assembly of claim 8, wherein the layer of friction material is molded to both an inner surface and an outer surface of the backing support layer.

11. The clutch assembly of claim 1, wherein the backing support layer includes a metallic layer.

12. The clutch assembly of claim 1, further comprising a controller including control circuitry, wherein the controller is configured to selectively engage and disengage the inner cone member and the outer cone member from each other.

13. The clutch assembly of claim 1, wherein, when the inner cone member transitions from a disengaged configuration to an engaged configuration with the outer cone member, the first friction surface of the inner cone member frictionally engages the third friction surface of the friction member at a first differential speed, and the second friction surface of the outer cone member engages the fourth friction surface of the friction member at a second differential speed, and wherein the first differential speed and the second differential speed are both less than a third differential speed between the inner cone member and the outer cone member.

14. A cone clutch assembly comprising:
   an inner cone member configured to be rotationally coupled to a first shaft, the inner cone member defining a first friction surface;
   an outer cone member configured to be rotationally coupled to a second shaft, the outer cone member defining a second friction surface opposing the first friction surface; and
   an independent friction member positioned between the first friction surface of the inner cone member and the second friction surface of the outer cone member,
   wherein the inner cone member and outer cone member are configured to be selectively engaged and disengaged from each other,
   wherein, when the inner cone member is engaged with the outer cone member, the first friction surface of the inner cone member frictionally engages a third friction surface of the friction member, and the second friction surface of the outer cone member engages a fourth friction surface of the friction member such that rotational motion is transferred between the inner cone member and the outer cone member via the friction member,
   wherein the independent friction member includes a first layer of friction material, a second layer of friction material, and a backing support layer between the first layer of friction material and the second layer of friction material, wherein the first layer of friction material defines the third friction surface, wherein the second layer of friction material defines the fourth friction surface,
   wherein the backing support layer includes at least one aperture extending through the backing support layer, and wherein the first layer of friction material and the second layer of friction material are in contact via the at least one aperture.

15. The clutch assembly of claim 14, wherein the backing support layer includes a metallic layer.

16. The clutch assembly of claim 14, further comprising a controller including control circuitry, wherein the controller is configured to selectively engage and disengage the inner cone member and the outer cone member from each other.

17. The clutch assembly of claim 14, wherein, when the inner cone member transitions from a disengaged configuration to an engaged configuration with the outer cone member, the first friction surface of the inner cone member frictionally engages the third friction surface of the friction member at a first differential speed, and the second friction surface of the outer cone member engages the fourth friction surface of the friction member at a second differential speed, and wherein the first differential speed and the second differential speed are both less than a third differential speed between the inner cone member and the outer cone member.

18. A cone clutch assembly comprising:
   an inner cone member configured to be rotationally coupled to a first shaft, the inner cone member defining a first friction surface;
   an outer cone member configured to be rotationally coupled to a second shaft, the outer cone member defining a second friction surface opposing the first friction surface; and
   an independent friction member positioned between the first friction surface of the inner cone member and the second friction surface of the outer cone member,
   wherein the inner cone member and outer cone member are configured to be selectively engaged and disengaged from each other,
   wherein, when the inner cone member is engaged with the outer cone member, the first friction surface of the inner cone member frictionally engages a third friction surface of the friction member, and the second friction surface of the outer cone member engages a fourth friction surface of the friction member such that rotational motion is transferred between the inner cone member and the outer cone member via the friction member,
   wherein the independent friction member includes a first layer of friction material, a second layer of friction material, and a backing support layer between the first layer of friction material and the second layer of friction material, wherein the first layer of friction material defines the third friction surface, wherein the second layer of friction material defines the fourth friction surface,
   wherein the backing support layer includes at least one recess in the backing support layer, and wherein at least one of the first layer of friction material or the second layer of friction material is located within the at least one recess.

19. The clutch assembly of claim 18, wherein the at least one recess has an undercut wall configuration to mechanically attach the first layer of friction material to the backing support layer.

20. The clutch assembly of claim 18, wherein the backing support layer includes a metallic layer.

* * * * *